United States Patent
Jung et al.

(10) Patent No.: US 9,582,856 B2
(45) Date of Patent: Feb. 28, 2017

(54) METHOD AND APPARATUS FOR PROCESSING IMAGE BASED ON MOTION OF OBJECT

(71) Applicant: Samsung Electronics Co., Ltd., Suwon-si, Gyeonggi-do (KR)

(72) Inventors: Seung-Won Jung, Seoul (KR); Ouk Choi, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 8 days.

(21) Appl. No.: 14/682,752

(22) Filed: Apr. 9, 2015

(65) Prior Publication Data

US 2015/0294178 A1 Oct. 15, 2015

(30) Foreign Application Priority Data

Apr. 14, 2014 (KR) .................. 10-2014-0044456

(51) Int. Cl.
*G06K 9/00* (2006.01)
*G06T 5/00* (2006.01)

(52) U.S. Cl.
CPC .............. *G06T 5/00* (2013.01); *G06T 5/005* (2013.01)

(58) Field of Classification Search
CPC ................................. G06T 5/00; G06T 5/005
See application file for complete search history.

(56) References Cited

U.S. PATENT DOCUMENTS

| 5,717,463 A * | 2/1998 | Brailean ............ H04N 19/543 348/699 |
| 6,377,623 B1 * | 4/2002 | Ra ..................... H04N 19/53 348/E5.066 |
| 9,367,920 B2 * | 6/2016 | Choi .................... G06T 7/0051 |
| 2008/0181306 A1 * | 7/2008 | Kim .................... H04N 19/61 375/240.16 |
| 2008/0204602 A1 * | 8/2008 | Beric .................. H04N 19/56 348/699 |
| 2008/0239144 A1 * | 10/2008 | Tanase ................ H04N 7/014 348/441 |
| 2008/0253676 A1 * | 10/2008 | Oh .................... H04N 5/23248 382/255 |
| 2009/0016640 A1 * | 1/2009 | Klein Gunnewiek .. G06T 5/005 382/276 |
| 2009/0128563 A1 * | 5/2009 | Gloudemans .......... G06K 9/346 345/427 |

(Continued)

FOREIGN PATENT DOCUMENTS

| KR | 20090040032 A | 4/2009 |
| KR | 20110135786 A | 12/2011 |

(Continued)

*Primary Examiner* — Aaron W Carter
(74) *Attorney, Agent, or Firm* — Harness, Dickey & Pierce, P.L.C.

(57) ABSTRACT

An apparatus and method for processing an image based on a motion of an object, the apparatus including a motion estimator configured to estimate a motion of an object included in a current image, an image determiner configured to determine a neighboring image neighboring the current image based on the motion of the object, and a pixel value determiner configured to determine a pixel value of a hole region neighboring the object based on the neighboring image is provided.

19 Claims, 14 Drawing Sheets

(56) References Cited

U.S. PATENT DOCUMENTS

| | | | |
|---|---|---|---|
| 2009/0231447 A1* | 9/2009 | Paik | G01S 3/7864 348/208.4 |
| 2011/0069237 A1* | 3/2011 | Wang | H04N 5/145 348/699 |
| 2011/0211083 A1* | 9/2011 | Petrides | G06T 5/005 348/208.4 |
| 2011/0211119 A1* | 9/2011 | Petrides | H04N 5/145 348/576 |
| 2011/0211124 A1* | 9/2011 | Petrides | G06T 5/003 348/607 |
| 2011/0211125 A1* | 9/2011 | Petrides | H04N 19/105 348/616 |
| 2011/0211128 A1* | 9/2011 | Petrides | H04N 5/144 348/699 |
| 2012/0008689 A1* | 1/2012 | Nasu | H04N 19/132 375/240.16 |
| 2012/0105435 A1 | 5/2012 | Chen et al. | |
| 2012/0230603 A1 | 9/2012 | Lee et al. | |
| 2012/0242789 A1 | 9/2012 | Cheng et al. | |
| 2012/0262542 A1 | 10/2012 | Veera et al. | |
| 2013/0051473 A1* | 2/2013 | Chen | H04N 19/533 375/240.16 |
| 2013/0107005 A1* | 5/2013 | Lim | H04N 5/33 348/46 |
| 2013/0127844 A1* | 5/2013 | Koeppel | G06T 15/205 345/419 |
| 2014/0009462 A1* | 1/2014 | McNamer | G06T 19/20 345/419 |
| 2014/0085294 A1* | 3/2014 | Jung | G06T 17/00 345/419 |
| 2014/0126818 A1* | 5/2014 | Wei | G06T 7/2006 382/171 |
| 2014/0233848 A1* | 8/2014 | Han | G06K 9/00375 382/154 |
| 2015/0015569 A1* | 1/2015 | Jung | G06T 15/005 345/419 |
| 2015/0049937 A1* | 2/2015 | Choi | G06T 7/0051 382/154 |
| 2015/0110414 A1* | 4/2015 | Cho | H04N 13/0022 382/254 |
| 2015/0215600 A1* | 7/2015 | Norkin | H04N 13/0011 348/43 |
| 2015/0245049 A1* | 8/2015 | Lee | H04N 19/52 375/240.16 |
| 2015/0294178 A1* | 10/2015 | Jung | G06T 5/00 382/195 |
| 2015/0310660 A1* | 10/2015 | Mogilefsky | G06T 13/40 345/422 |

FOREIGN PATENT DOCUMENTS

| | | |
|---|---|---|
| KR | 20120049636 A | 5/2012 |
| KR | 20120084627 A | 7/2012 |

\* cited by examiner

METHOD AND APPARATUS FOR PROCESSING IMAGE BASED ON MOTION OF OBJECT

CROSS-REFERENCE TO RELATED APPLICATION

This application claims the priority benefit of Korean Patent Application No. 10-2014-0044456, filed on Apr. 14, 2014, in the Korean Intellectual Property Office, the entire disclosure of which is incorporated herein by reference.

BACKGROUND

1. Field

At least some example embodiments of the following description relate to a method and apparatus for processing an image based on a motion of an object, and more particularly, to a method and apparatus for processing a hole region based on a motion of an object included on a temporally neighboring image.

2. Description of the Related Art

A depth image based rendering (DIBR) may be technology for generating a plurality of color images, each acquired from a different viewpoint by inputting a single color image and a depth image. The generated color images may be represented as a three-dimensional (3D) image on a stereoscopic display. When the input color image is converted into a color image of another viewpoint, a region obscured by an object in the input color image may be displayed. The region obscured by the object may be defined as a hole region or a disocclusion region.

In a general hole region processing method, a hole region may be restored by determining a pixel value of the hole region based on a pixel value of a neighboring region of the hole region. However, due to a difference between the pixel value of the hole region and the pixel value of the neighboring region, the restored hole region may differ from an original hole region. The difference between the restored hole region and the original hole region may result in degradation in a clarity of the plurality of color images, each acquired from a different viewpoint.

Accordingly, there is a desire for an image processing method to enhance the clarity of the plurality of color images, each acquired from a different viewpoint by precisely restoring the hole region.

SUMMARY

The foregoing and/or other aspects are achieved by providing an image processing apparatus including a motion estimator configured to estimate a motion of an object included in a current image, an image determiner configured to determine a neighboring image neighboring the current image based on the motion of the object, and a pixel value determiner configured to determine a pixel value of a hole region neighboring the object based on the neighboring image.

The image determiner is configured to determine an image preceding the current image to be the neighboring image if the estimated motion of the object corresponds to a zoom-in motion.

The image determiner is configured to determine an image subsequent to the current image to be the neighboring image if the estimated motion of the object corresponds to a zoom-out motion.

The image determiner is configured to determine one of an image preceding the current image and an image subsequent to the current image to be the neighboring image based on a position of the hole region and a moving direction of the object.

The image determiner is configured to determine the image preceding the current image to be the neighboring image when the moving direction of the object is identical to a direction in which the hole region is located.

The image determiner is configured to determine an image subsequent to the current image to be the neighboring image if the moving direction of the object is opposite to a direction in which the hole region is located.

The image processing apparatus may further include a hole region divider configured to divide the hole region into a first region and a second region.

The hole region divider is configured to divide the hole region into the first region and the second region based on a size of the hole region and a motion vector of a neighboring region of the hole region.

The pixel value determiner is configured to determine a pixel value of the second region based on a pixel value of the first region and a pixel value of a neighboring region of the hole region.

If the hole region includes a pixel for which a pixel value is not determined based on the neighboring image, the image determiner may search images preceding or subsequent to the current image for an image in which all pixel values of the hole region are determined, and determine the found image to be the neighboring image.

The pixel value determiner is configured to search the neighboring region for a pixel corresponding to the hole region based on a motion vector of the hole region and determine the pixel value of the hole region based on a pixel value of the found pixel.

The pixel value determiner is configured to predict the motion vector of the hole region, and set a search range for a pixel in the neighboring region based on an accuracy of the predicted motion vector.

The foregoing and/or other aspects are achieved by providing an image processing method including estimating a motion of an object included in a current image, determining a neighboring image neighboring the current image based on the estimated motion of the object, and determining a pixel value of a hole region neighboring the object based on the neighboring image.

The foregoing and/or other aspects are achieved by providing an image processing method including estimating a motion of an object included in a current image, determining a neighboring image temporally neighboring the current image based on the estimated motion of the object, determining a pixel value of a hole region neighboring the object based on the neighboring image, searching for an image in which all pixel values of the hole region are determined, from the images preceding or subsequent to the current image and re-determining the found image to be the neighboring image when the hole region includes a pixel for which a pixel value is not determined based on the neighboring image, and determining the pixel value of the hole region based on the re-determined neighboring image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Hereinafter, some example embodiments are described below to explain the present disclosure by referring to the figures.

Figure 1:
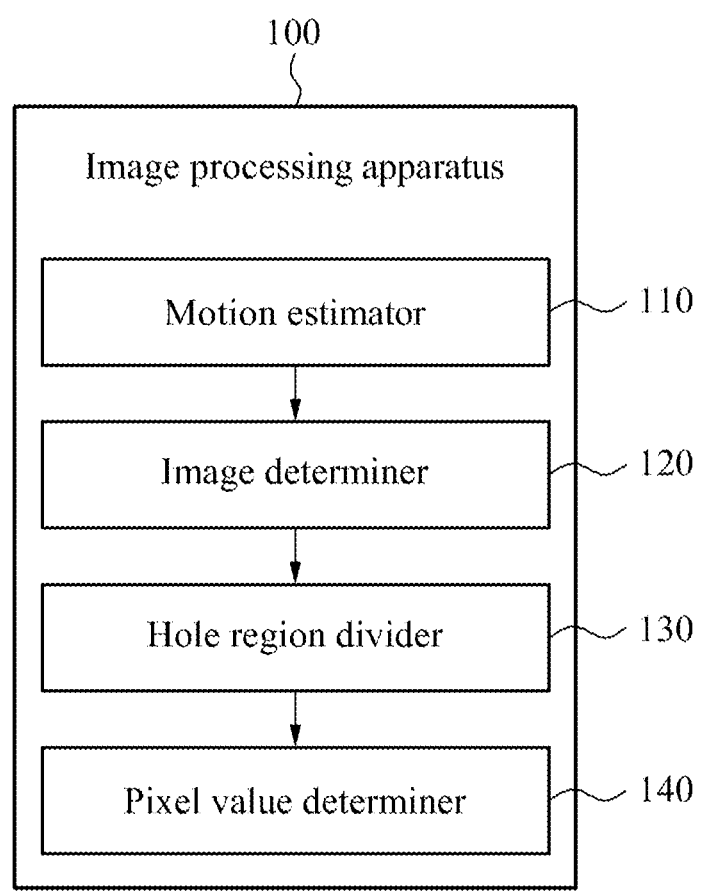
FIG. 1 illustrates a configuration of an image processing apparatus according to at least one example embodiment.

FIG. 1 illustrates a configuration of an image processing apparatus 100 according to at least one example embodiment.

The image processing apparatus 100 may process a hole region occurring in multiview color images generated by applying a depth image based rendering (DIBR) technology to a single color image and a depth image.

Referring to FIG. 1, the image processing apparatus 100 may include a motion estimator 110, an image determiner 120, a hole region divider 130 and a pixel value determiner 140.

The motion estimator 110, the image determiner 120, the hole region divider 130 and the pixel value determiner 140 may be hardware, firmware, hardware executing software or any combination thereof. When at least one of the motion estimator 110, the image determiner 120, the hole region divider 130 and the pixel value determiner 140 is hardware, such existing hardware may include one or more Central Processing Units (CPUs), digital signal processors (DSPs), application-specific-integrated-circuits (ASICs), field pro-grammable gate arrays (FPGAs) computers or the like configured as special purpose machines to perform the functions of the at least one of the image capturer 210, the image calibrator 230, and the image generator 250. CPUs, DSPs, ASICs and FPGAs may generally be referred to as processors and/or microprocessors.

In the event where at least one of the motion estimator 110, the image determiner 120, the hole region divider 130 and the pixel value determiner 140 is a processor executing software, the processor is configured as a special purpose machine to execute the software, stored in a storage medium, to perform the functions of the at least one of motion estimator 110, the image determiner 120, the hole region divider 130 and the pixel value determiner 140. In such an embodiment, the processor may include one or more Central Processing Units (CPUs), digital signal processors (DSPs), application-specific-integrated-circuits (ASICs), field programmable gate arrays (FPGAs) computers.

The motion estimator 110 may estimate a motion of an object included in a current image. In this example, the motion estimator 110 may estimate whether the object moves and a type of the motion based on depth information and a motion vector of a neighboring region located in each of a left side and a right side of the object. The motion vector of the neighboring region may be calculated by applying a technique, for example, motion estimation and optical flow estimation to the current image, an image preceding the current image, and an image subsequent to the current image. Hereinafter, the image preceding the current image may also be referred to as a preceding image of the current image, and the image subsequent to the current image may also be referred to as a subsequent image of the current image.

The motion estimator 110 may determine whether the object moves by comparing a horizontal component of the motion vector of the neighboring region to a threshold. In this example, the motion estimator 110 may compare, to the threshold, each of a horizontal component of a motion vector in a left neighboring region of the hole region and a horizontal component of a motion vector in a right neighboring region of the hole region. When an average or median value among horizontal components of motion vectors of pixels included in the left neighboring region is less than or equal to the threshold, the motion estimator 110 may estimate that a motion is absent in the left neighboring region. When an average or median value among horizontal components of motion vectors of pixels included in the right neighboring region is less than or equal to the threshold, the motion estimator 110 may estimate that a motion does not occur in the right neighboring region. When a motion does not occur in the left neighboring region and the right neighboring region, the motion estimator 110 may determine that the object does not move. In this example, the motion estimator 110 may operate the pixel value determiner 140, in lieu of the image determiner 120. The pixel value determiner 140 may determine a pixel value of the hole region based on a pixel value of the neighboring region of the hole region.

The motion estimator 110 may determine the type of the motion of the object to be one of a translation and a zoom based on the depth information and the motion vector of the neighboring region. Since the hole region occurs due to a depth difference between objects, one of the left neighboring region and the right neighboring region may correspond to a foreground, and the other may correspond to a background. The zoom may refer to a motion through which a distance relative to the foreground increases or decreases.

Thus, the motion estimator 110 may determine whether the zoom occurs in a region corresponding to the foreground.

In this example, the motion estimator 110 may identify a foreground region between the left neighboring region and the right neighboring region based on depth information on the left neighboring region and depth information on the right neighboring region. The motion estimator 110 may extract a region corresponding to the foreground region from the preceding image based on a motion vector of the foreground region, and estimate whether the zoom occurs, by comparing depth information on the extracted region and depth information on the foreground region. For example, when a difference between the depth information on the extracted region and the depth information on the foreground region is greater than a positive threshold, the motion estimator 110 may estimate the type of the motion of the object to be a zoom-in motion, for example, a zoom-in. When the difference between the depth information on the extracted region and the depth information on the foreground region is less than a negative threshold, the motion estimator 110 may estimate the type of the motion of the object to be a zoom-out motion, for example, a zoom-out. When the difference between the depth information on the extracted region and the depth information on the foreground region is less than the positive threshold and greater than the negative threshold, the motion estimator 110 may estimate the type of the motion of the object to be the translation.

The image determiner 120 may determine a neighboring image temporally neighboring the current image based on the motion of the object estimated by the motion estimator 110.

When the motion is the zoom causing a change in depth information on the object, the image determiner 120 may determine the neighboring image based on a type of the zoom. For example, when the motion is the zoom-in, the image determiner 120 may determine the preceding image of the current image to be the neighboring image. When the motion is the zoom-out, the image determiner 120 may determine the subsequent image of the current image to be the neighboring image.

When the motion is the translation causing a change in a position of the object, the image determiner 120 may determine the preceding image or the subsequent image of the current image to be the neighboring image based on a moving direction of the object and a position of the hole region. For example, relative to the object, when the moving direction of the object is identical to a direction in which the hole region is located, the image determiner 120 may determine the preceding image of the current image to be the neighboring image. Also, relative to the object, when the moving direction of the object is opposite to the direction in which the hole region is located, the image determiner 120 may determine the subsequent image of the current image to be the neighboring image.

A position of the object included in the current image may differ from a position of an object included in a multiview image acquired by applying a DIBR to the current image. For example, when a hole region of the multiview image is processed based on the preceding image or the subsequent image of the current image, a change in a background region caused by a difference between the position of the object included in the current image and the position of the object included in the multiview image may not be reflected. Thus, the image determiner 120 may determine a multiview image acquired by applying the DIBR to the current image or a multiview image acquired by applying the DIBR to the current image, to be the neighboring image.

The hole region divider 130 may divide the hole region into a first region and a second region when the hole region includes a pixel for which a pixel value is not determined based on the neighboring image. In this example, the first region may be a region in which the pixel value is determined based on the neighboring image, and the second region may be a region in which the pixel value is not determined based on the neighboring image. When pixel values of all pixels included in the hole region are determined based on the neighboring image, the hole region divider 130 may not divide the hole region.

In the hole region, the hole region divider 130 may identify the pixel for which the pixel value is not determined based on the neighboring image. When the pixel for which the pixel value is not determined based on the neighboring image is present, the hole region divider 130 may divide the hole region into the first region and the second region based on a size of the hole region and a motion vector of the neighboring region of the hole region.

The pixel value determiner 140 may determine a pixel value of the hole region neighboring the object based on the neighboring image determined by the image determiner 120. When the hole region is not divided, the pixel value determiner 140 may search the neighboring region for a pixel corresponding to the hole region based on the motion vector of the hole region, and determine the pixel value of the hole region based on a pixel value of the found pixel.

For example, the pixel value determiner 140 may search the neighboring region for the pixel corresponding to the hole region based on a patch matching method.

In this example, the pixel value determiner 140 may generate a patch including the hole region and the neighboring region, and search the neighboring image for an optimal patch among similar patches to the generated patch. The pixel value determiner 140 may determine the pixel value of the pixel included in the hole region based on a pixel value of a pixel included in the optimal patch. In this example, the pixel value determiner 140 may set a search range in the neighboring image, and search for the optimal patch from the set search range. When the search range is expanded, an operation performed by the pixel value determiner 140 to search for the optimal patch may correspondingly increase.

The pixel value determiner 140 may predict the motion vector of the hole region, and set the search range for a pixel in the neighboring image based on an accuracy of the predicted motion vector. To perform a patch matching, the pixel value determiner 140 may predict the motion vector of the hole region based on a motion vector of the neighboring region. For example, the pixel value determiner 140 may predict the motion vector of the hole region based on a motion inpainting or a motion vector inpainting. The pixel value determiner 140 may determine an initial position to initiate a search in the neighboring image based on the predicted motion vector. The pixel value determiner 140 may set the search range based on the initial position, and perform the patch matching. The pixel value determiner 140 may use a pixel value determined in the hole region for a patch matching of the subsequent image. The pixel value determiner 140 may adjust the search range based on the accuracy of the motion vector. For example, the pixel value determiner 140 may reduce the search range according to an increase in the accuracy of the motion vector, and may expand the search range according to a decrease in the accuracy of the motion vector.

When the image determiner 120 determines the preceding image or the subsequent image of the current image to be the neighboring image, the pixel value determiner 140 may generate a multiview image of the neighboring image by applying the DIBR to the neighboring image. The pixel value determiner 140 may determine the pixel value of the hole region neighboring the object based on the multiview image of the neighboring image.

When the hole region is divided into the first region and the second region, the pixel value determiner 140 may determine the pixel value of the first region based on the pixel value of the neighboring image determined by the image determiner 120, and determine the pixel value of the second region based on the pixel value of the first region and the pixel value of the neighboring region of the hole region.

When the hole region is divided into the first region and the second region, the image determiner 120 may search for an image in which all pixel values of the hole region are determined, from the preceding image and the subsequent image of the current image, and re-determine the found image to be the neighboring image. In this example, the pixel value determiner 140 may determine all pixel values of the hole region based on a pixel value of the re-determined neighboring image.

Figure 6:
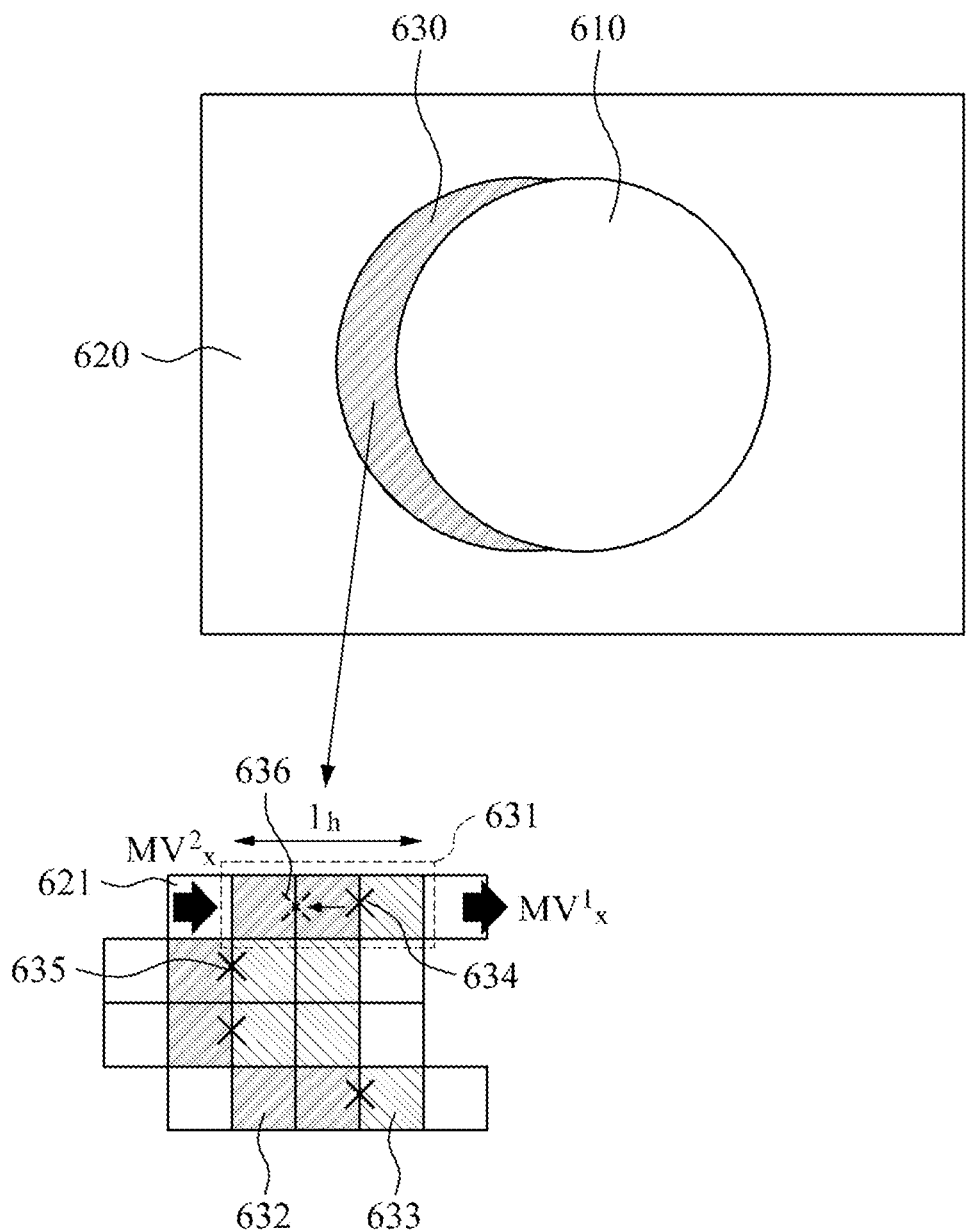
FIG. 6 illustrates an example of determining a pixel value of a hole region according to at least one example embodiment.

Descriptions about a process in which the pixel value determiner 140 determines the pixel value of the second region will be provided with reference to FIG. 6.

Figure 2:
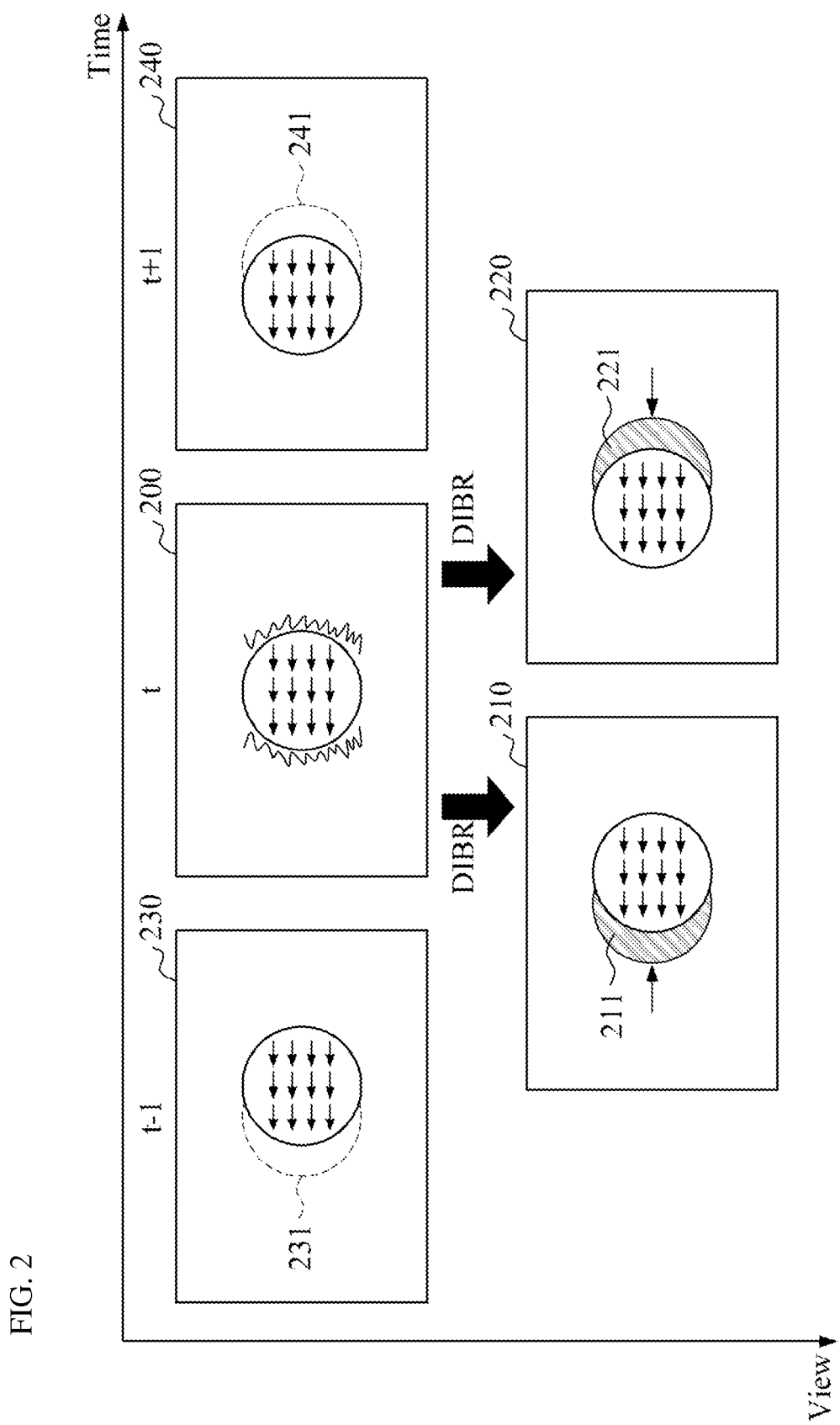
FIG. 2 illustrates an operation of an image processing apparatus according to at least one example embodiment.

FIG. 2 illustrates an operation of an image processing apparatus according to at least one example embodiment.

A DIBR device may generate a first view color image 210 and a second view color image 220 based on a depth image and a current image 200 corresponding to a time t. As shown in FIG. 2, the first view color image 210 may be generated by moving an object of the current image 200 in a rightward direction and thus, a hole region 211 obscured by the object may occur on a left side of the object. Also, the second view color image 220 may be generated by moving the object of the current image 200 in a leftward direction and thus, a hole region 221 obscured by the object may occur on a right side of the object.

Since the object moves in the leftward direction, an object displayed on a preceding image 230 corresponding to a time t−1 may be located on the right side of the object displayed on the current image 200. Thus, a background region 231 corresponding to the hole region 211 may be indicated in the preceding image 230. By determining a pixel value of the hole region 211 based on a pixel value of a pixel included in the background region 231, the image processing apparatus 100 may restore the hole region 211 more precisely when compared to using a pixel value of a neighboring region.

The object displayed on a subsequent image 240 corresponding to a time t+1 may be located on the left side of the object displayed on the current image 200. Thus, a background region 241 corresponding to the hole region 221 may be indicated in the subsequent image 240. By determining a pixel value of the hole region 221 based on a pixel value of a pixel included in the background region 241, the image processing apparatus 100 may restore the hole region 221 more precisely when compared to using a pixel value of a neighboring region.

Figure 3:
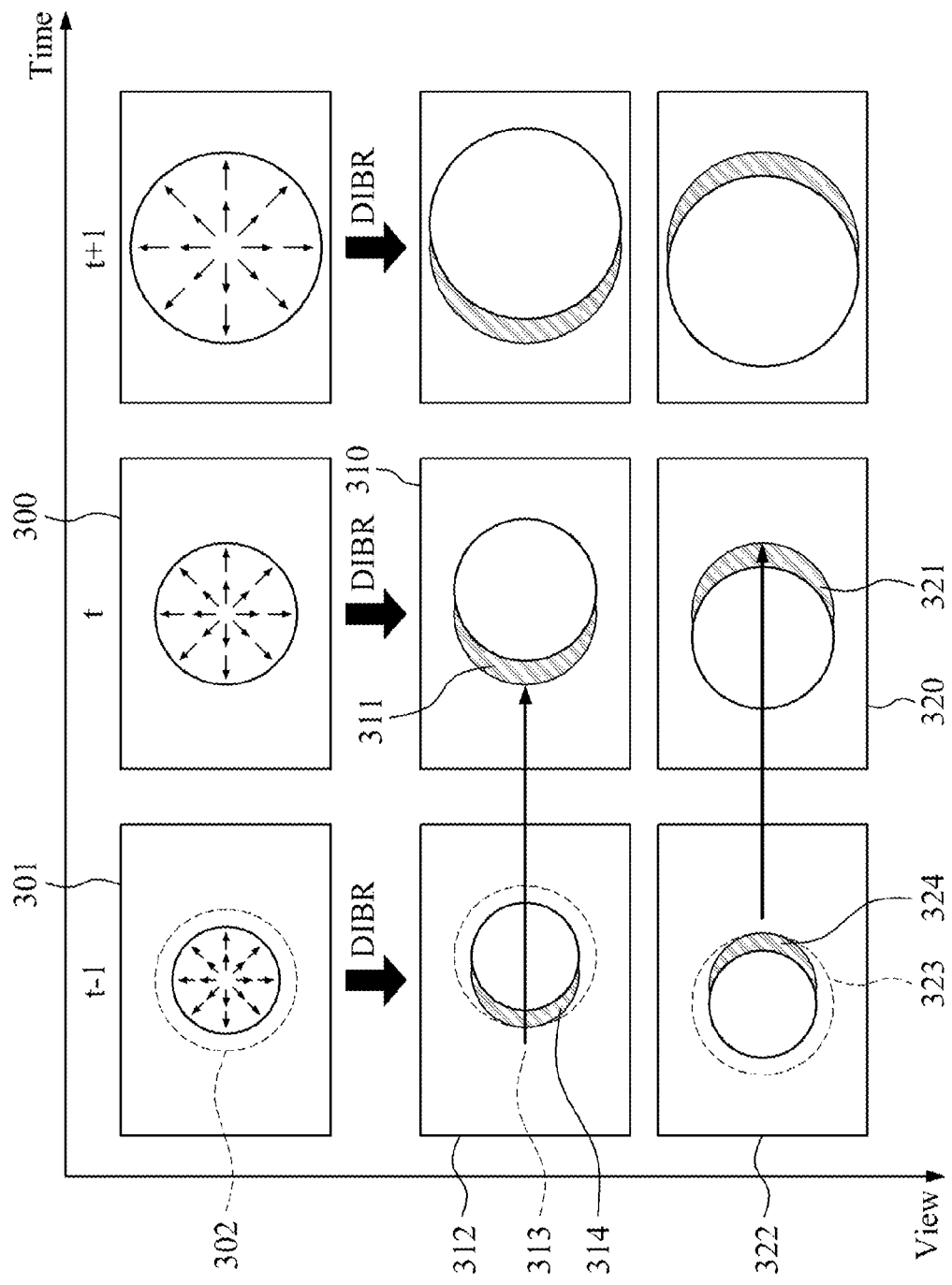
FIG. 3 illustrates an example of processing an image including an object performing a zoom-in according to at least one example embodiment.

FIG. 3 illustrates an example of processing an image including an object performing a zoom-in according to at least one example embodiment.

Referring to FIG. 3, when an object displayed on a color image performs the zoom-in by a time lapse, the image processing apparatus 100 may process a hole region based on a preceding image. When the object performs the zoom-in, a size of the object displayed on the color image may increase by the time lapse. For example, a size of the object displayed on a preceding image 301 corresponding to a time t−1 may be less than a size of the object displayed on a current image 300. Thus, a background region 301 not indicated in the current image 300 corresponding to a time t may be indicated in the preceding image 301. A hole region 311 and a hole region 321 may occur in a first view image 310 corresponding to the time t and a second view image 320 corresponding to the time t, respectively. The hole region 311 and the hole region 321 may be included in the background region 302. By determining pixel values of the hole region 311 and the hole region 321 based on a pixel value of a pixel included in the background region 302, the image processing apparatus may precisely restore the hole region 311 and the hole region 321.

The background region 302 may not reflect a position of the object differently indicated in each of a first view image 312 corresponding to the time t−1 and a second view image 322 corresponding to the time t−1, and a change in a background region due to the position of the object. By determining the pixel value of the hole region 311 based on a background region 313 additionally displayed on the first view image 312 corresponding to the time t−1 as compared to the first view image 310 corresponding to the time t, the image processing apparatus 100 may restore the hole region 311 more precisely when compared to using the background region 302. In this example, the first view image 312 corresponding to the time t−1 may be an image acquired by restoring a hole region 314 based on a first view image corresponding to a time t−2. By determining the pixel value of the hole region 321 based on a background region 323 additionally displayed on the second view image 322 corresponding to the time t−1 as compared to the second view image 320 corresponding to the time t, the image processing apparatus 100 may restore the hole region 321 more precisely when compared to using the background region 302. The second view image 322 corresponding to the time t−1 may be an image acquired by restoring a hole region 324 based on a second view image corresponding to the time t−2.

Figure 4:
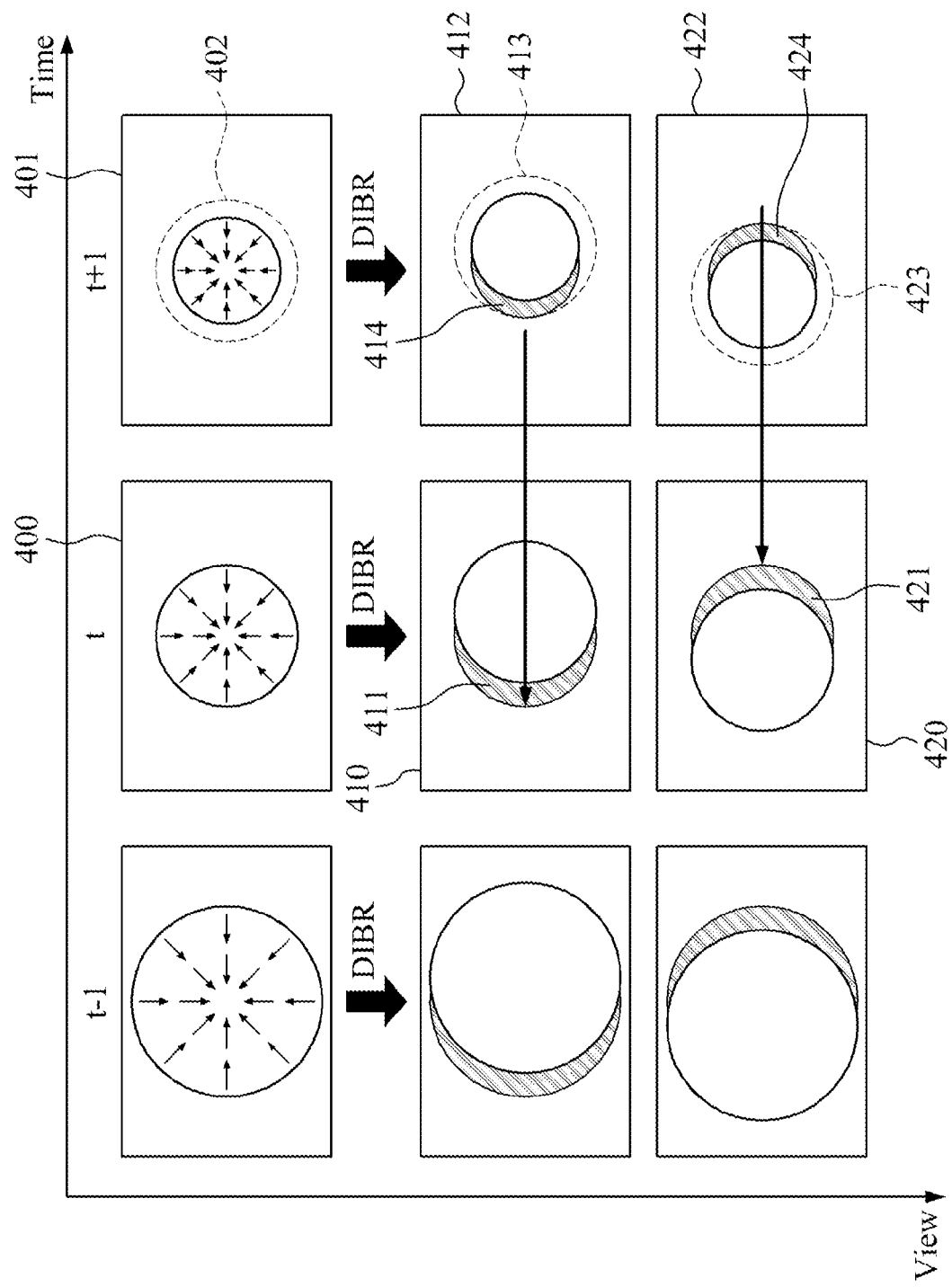
FIG. 4 illustrates an example of processing an image including an object performing a zoom-out according to at least one example embodiment.

FIG. 4 illustrates an example of processing an image including an object performing a zoom-out according to at least one example embodiment.

Referring to FIG. 4, when an object displayed on a color image performs the zoom-out by a time lapse, the image processing apparatus 100 may process a hole region based on a subsequent image. When the object performs the zoom-out, a size of the object displayed on the color image may decrease by the time lapse, as shown in FIG. 4. For example, a size of the object displayed on a subsequent image 401 corresponding to a time t+1 may be less than a size of the object displayed on a current image 400 corresponding to a time t. Thus, a background region 402 not indicated in the current image corresponding to the time t may be additionally indicated in the subsequent image 401. In this example, a hole region 411 and a hole region 421 may occur in a first view image 410 corresponding to the time t and a second view image 420 corresponding to the time t, respectively. The hole region 411 and the hole region 421 may be included in the background region 402. By determining pixel values of the hole region 411 and the hole region 421 based on a pixel value of a pixel included in the background region 402, the image processing apparatus 100 may precisely restore the hole region 411 and the hole region 421.

The background region 402 may not reflect a position of the object differently displayed on each of a first view image 412 corresponding to the time t+1 and a second view image 422 corresponding to the time t+1, and a change in a background region due to the position of the object. By determining the pixel value of the hole region 411 based on a background region 413 additionally indicated in the first view image 412 corresponding to the time t+1 as compared to the first view image 410 corresponding to the time t, the image processing apparatus 100 may restore the hole region 411 more precisely when compared to using the background region 402. In this example, the first view image 412 corresponding to the time t+1 may be an image acquired by restoring a first view image corresponding to a time t+2. By determining the pixel value of the hole region 421 based on a background region 423 additionally indicated in the second view image 422 corresponding to the time t+2 as compared to the second view image 420 corresponding to the time t, the image processing apparatus 100 may restore the hole region 421 more precisely when compared to using the background region 402. In this example, the second view image 422 corresponding to the time t+1 may be an image acquired by restoring a hole region 424 based on the second view image corresponding to the time t+2.

Figure 5:
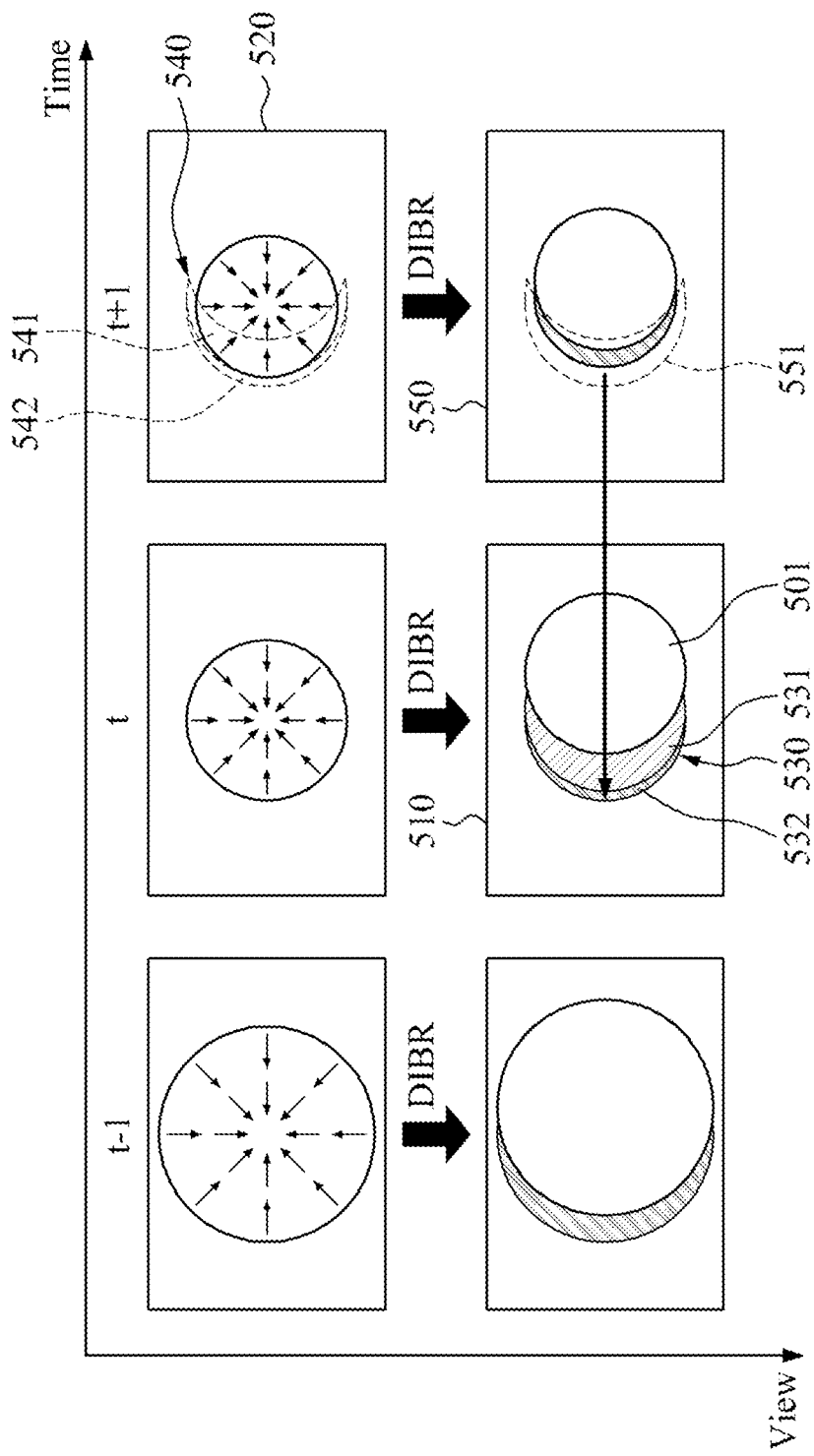
FIG. 5 illustrates an example of processing an image when all pixels of a hole region are not determined by an image processing apparatus based on a neighboring image according to at least one example embodiment.

FIG. 5 illustrates an example of processing an image when all pixels of a hole region are not determined by an image processing apparatus based on a neighboring image according to at least one example embodiment.

A hole region may include a region in which it is not possible for the image processing apparatus 100 to determine a pixel value based on a neighboring image. For example, when a zoom-out is performed to be less than a threshold, a difference between a size of an object 501 displayed on a first view image 510 corresponding to a current time, for example, a time t, and a size of the object 501 displayed on a subsequent image 520 corresponding to a time t+1 may be relatively small. In this example, a region 541 which is a portion of a background region 540 corresponding to a hole region 530 and not indicated in the first view image 510 corresponding to the current time may be obscured by the object 501 at the time t+1. For example, a pixel value of the region 541 may be absent in the subsequent image 520 corresponding to the time t+1. Thus, a pixel value of a region 531 corresponding to the region 541 of the hole region 510 may not be determined based on the subsequent image 520 corresponding to the time t+1.

The image processing apparatus 100 may classify the hole region 530 into the region 531 corresponding to the region 541 and a region 532 corresponding to a region 542 in which a background is indicated in the subsequent image 520, and process each of the region 531 and the region 532 using a different method. For example, the image processing apparatus 100 may determine a pixel value of the region 532 based on a pixel value included in the region 542. Also, the image processing apparatus 100 may determine a pixel value of the region 531 based on pixel values of neighboring regions located on a left side and a right side of the hole region 530. The image processing apparatus 100 may determine the pixel value of the region 531 based on the pixel value of the region 532 and a pixel value of a neighboring region located on the right side of the hole region 530, thereby minimizing an error caused by a difference among the pixel values of the neighboring regions.

When a first view image 550 corresponding to the time t+1 is an image acquired by restoring a hole region based on a first view image corresponding to a time t+2, the first view image 550 corresponding to the time t+1 may not be displayed on the first view image 510 corresponding to the current time, and include a background region 551 corresponding to the hole region 530 as shown in FIG. 5. In this example, the image processing apparatus 100 may determine a pixel value of the hole region 530 based on the background region 551.

FIG. 6 illustrates an example of determining a pixel value of a hole region according to at least one example embodiment.

The motion estimator 110 of the image processing apparatus 100 may define depth information and a horizontal component of a motion vector of a pixel included in a neighboring region 620 located on a left side of an $n^{th}$ line of a hole region 630, as $Z_{left}(n)$ and $mv_{left-x}(n)$, respectively. Also, the motion estimator 110 may define depth information and a horizontal component of a motion vector of a pixel included in a neighboring region 610 located on a right side of the $n^{th}$ line of the hole region 630, as $Z_{right}(n)$ and $mv_{right-x}(n)$, respectively. The hole region 630 may include a plurality of hole lines 631 as shown in FIG. 6. The motion estimator 110 may define $Z_{left}$ indicating a set of depth information on pixels included in the neighboring region 620, as $\{Z_{left}(1), \ldots, Z_{left}(N)\}$. In $Z_{left}$, N may denote a number of the hole lines 631 included in the hole region 630. The motion estimator 110 may define $Z_{right}$ indicating a set of depth information on pixels included in the neighboring region 620, $mv_{left-x}$ indicating a set of horizontal components of motion vectors of pixels included in a neighboring region 610, and $mv_{right-x}$ indicating a set of horizontal components of motion vectors of pixels included in the neighboring region 610 as $\{Z_{right}(1), \ldots, Z_{right}(N)\}$, $\{mv_{left}(1), \ldots, mv_{left-x}(N)\}$, and $\{mv_{right-x}(1), \ldots, mv_{right-x}(N)\}$, respectively.

The motion estimator 110 may estimate whether an object and a background move, based on $mv_{left-x}$ and $mv_{right-x}$. For example, an average or median value of values included in $mv_{left-x}$ is less than or equal to a threshold, the motion estimator 110 may determine that a motion is absent in the neighboring region 620. Also, when an average or median value of values included in $mv_{right-x}$ is less than or equal to the threshold, the motion estimator 110 may estimate that the motion is absent in the neighboring region 610. When the motion is absent in the neighboring region 610 and the neighboring region 620, the hole region 630 may not be processed based on a neighboring image. Thus, the motion estimator 110 may operate the pixel value determiner 140, in lieu of the image determiner 120. The pixel value determiner 140 may determine a pixel value of the hole region 630 based on pixel value of the neighboring region 610 and the neighboring region 620.

When the motion is estimated to be present in at least one of the neighboring region 610 and the neighboring region 620, the motion estimator 110 may identify the estimated motion to be one of a zoom and a translation. In this example, the motion estimator 110 may define a set of depth information corresponding to each pixel of the neighboring region 620 in a preceding image corresponding to a time t−1, as $Z_{left}^{t-1}=\{Z_{left}^{t-1}(1), \ldots, Z_{left}^{t-1}(N)\}$. Also, the motion estimator 110 may estimate whether the zoom occurs by comparing depth information on $Z_{left}$ and depth information on $Z_{left}^{t-1}$. For example, when an average or median value of $Z_{left}-Z_{left}^{t-1}$ is greater than or equal to a positive threshold, the motion estimator 110 may estimate that a zoom-in occurs. When the average or median value of $Z_{left}-Z_{left}^{t-1}$ is less than or equal to a negative threshold, the motion estimator 110 may estimate that a zoom-out occurs.

When the zoom-in occurs, information on a background region corresponding to the hole region 630 may be included in a preceding image and thus, the image determiner 120 may determine the preceding image to be a neighboring image of a current image. When the zoom-out occurs, the information on the background region corresponding to the hole region 630 may be included in a subsequent image corresponding to a time t+1 and thus, the image determiner 120 may determine the subsequent image to be the neighboring image of the current image. Thus, when the motion of the neighboring region 610 corresponding to the object is the zoom, the neighboring image may be determined based on a type of the zoom irrespective of the motion vector and the position of the hole region 630.

When the zoom-in or the zoom-out does not occur, the motion estimator 110 may estimate a type of the motion to be the translation. The image determiner 120 may determine the neighboring image based on the motion vector and the position of the hole region 630. For example, when an object moves in a leftward direction and a hole region occurs on a left side of the object, information corresponding to the hole region may be included in a preceding image. Thus, the image determiner 120 may determine the preceding image to be the neighboring image. Concisely, when a moving direction of the object is identical to a direction in which the hole region occurs relative to the object, the image determiner 120 may determine the preceding image to be the neighboring image. Also, when the object moves in the leftward direction and the hole region occurs on a right side of the object, the information corresponding to the hole region may be included in the subsequent image. Thus, the image determiner 120 may determine the subsequent image to be the neighboring image. Concisely, the moving direction of the object differs from the direction in which the hole region occurs relative to the object, the image determiner 120 may determine the subsequent image to be the neighboring image.

The hole region divider 130 may identify a pixel included in the hole region and having a pixel value not determined based on the neighboring image determined by the image determiner 120. For example, when a length of an $n^{th}$ line included in the hole region 630 is l(n), the hole region divider 130 may calculate $l_{unfaithful}(n)$ indicating a number of pixels included in the hole region and having pixel values not determined based on the neighboring image, using Equation 1.

$$l_{unfaithful}(n)=\max(l(n)-|mv_{left-x}(n)-mv_{right-x}(n)|,0) \quad \text{[Equation 1]}$$

When a difference in a relative magnitude of motion between the neighboring region 610 and the neighboring region 620 is greater than or equal to a length of the hole line, $l_{unfaithful}(n)$ may be "0" and thus, the pixel value determiner 140 may determine pixel values of all pixels included in the hole region 630 based on the neighboring image. Accordingly, the hole region divider 130 may not divide the hole region 630.

Conversely, when the difference in the relative magnitude of motion between the neighboring region 610 and the neighboring region 620 is less than the length of the hole line, the hole region may include a pixel having a pixel value not determined based on the neighboring image. Thus, the hole region divider 130 may divide the hole region 630 into a first region 632 of which a pixel value is determined based on the neighboring image and a second region 633 of which a pixel value is not determined based on the neighboring image.

In this example, the hole region divider 130 may independently calculate a pixel included in the first region 632 for each of the hole lines 631. When a position 634 of a boundary between the first region 632 and the second region 633 is defined as $p^0(n)$, two pixels may be included in the first region 632 in a first line of FIG. 6 and thus, $p^0(1)=2$. Equation 1 may be used to calculate the number of pixels included in the second region 633 based on a motion vector. Thus, an accuracy of Equation 1 may be determined based on an accuracy of the motion vector. The accuracy of the motion vector may be estimated based on a difference between the pixel value of the current image and a pixel value of a position indicated by a motion vector of the current image in the preceding image.

For example, the hole region divider 130 may more precisely determine the position 634 of the boundary using Equation 2 when compared to using Equation 1.

$$p_n^* = \underset{p_n}{\mathrm{argmin}}\left\{\lambda_n \cdot (p_n - p_n^0)^2 + \sum_{j \in N_n} (p_n - p_j)^2\right\} \quad \text{[Equation 2]}$$

In Equation 2, $(P_n-P^0{}_n)^2$ denotes a component used to maintain $l_{unfaithful}(n)$ calculated using Equation 1, and $$\sum_{j \in N_n} (p_n - p_j)^2$$

denotes a component used to modify the position 634 of the boundary to be a position similar to a boundary of a neighboring line located above or below the hole line. $N_n$ may be a set including the neighboring line located above the $n^{th}$ hole line and the neighboring line located below the $n^{th}$ hole line, and $\lambda_n$ may be used to adjust a weighted value of $$\sum_{j \in N_n} (p_n - p_j)^2$$

and $(P_n-P^0{}_n)^2$. Since $(P_n-P^0{}_n)^2$ depends on the accuracy of the motion vector, $\lambda_n$ may be adjusted using Equation 3.

[Equation 3]

$$\lambda_n = \frac{k}{\varepsilon(mv_{left-x}(n)) + \varepsilon(mv_{right-x}(n))}$$

In Equation 3, $\varepsilon(mv_{left-x}(n))$ may be a difference between a pixel value of a pixel 621 located on the right side of the $n^{th}$ hole line and a pixel value of a pixel located in a position indicated by a motion vector of a corresponding pixel in the preceding image. Also, k denotes a constant value used to adjust the weighted value of $$\sum_{j \in N_n} (p_n - p_j)^2$$

and $(P_n-P^0{}_n)^2$. In accordance with an increase of k, the position 634 of the boundary may be closed to $l_{unfaithful}(n)$. In accordance with a decrease of k, the position 634 of the boundary may be close to a position of the boundary of the neighboring line.

For example, when k is greater than or equal to a predetermined value, the hole region divider 130 may determine a position of a boundary of a first hole line to be the position 634 using Equation 1. When k is less than the predetermined value, the hole region divider 130 may determine the position of the boundary of the first hole line to be a position 636 based on a position 635 of a boundary of a second hole line. In this example, the position 636 of the boundary of the first hole line is closer to the position 635 of the boundary of the second hole line when compared to the position 634 and thus, a difference between the boundary of the first hole line and the boundary of the second hole line may be minimized.

Figure 7:
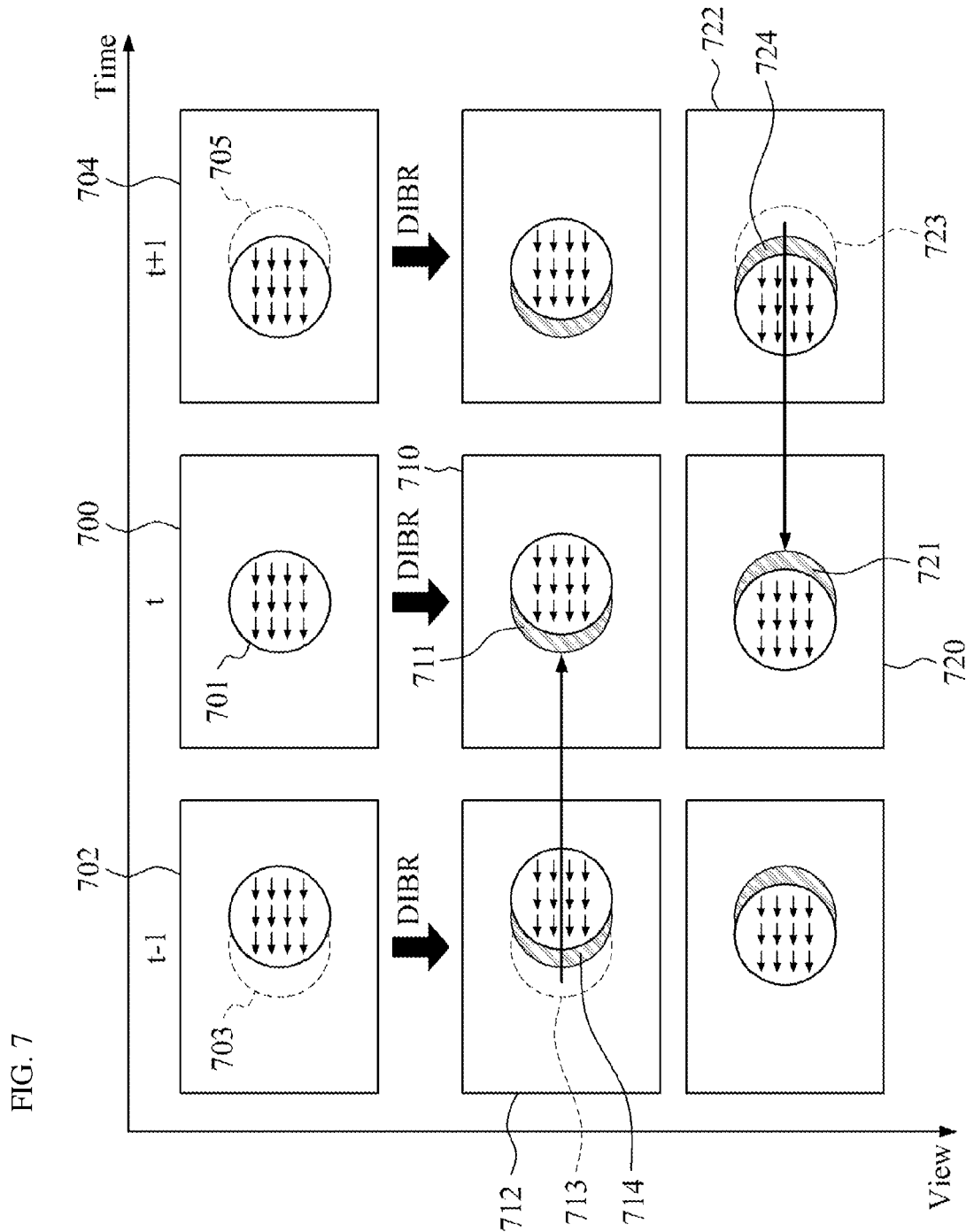
FIG. 7 illustrates an example of processing an image including an object moving in a leftward direction according to at least one example embodiment.

FIG. 7 illustrates an example of processing an image including an object moving in a leftward direction according to at least one example embodiment.

When an object displayed on a color image moves, the image processing apparatus 100 may process a hole region using a preceding image or a subsequent image based on a position of the hole region and a moving direction of the object. When an object 701 displayed on a color image moves in the leftward direction, a background region 703 of a preceding image 702 corresponding to a time t−1 may be obscured by the object 701 in a current image 700 corresponding to a time t. When the object 701 moves in the leftward direction, a subsequent image 704 corresponding to a time t+1 may display a background region 705 obscured by the object 701.

In this example, since a first view image 710 is generated by moving the object 701 in a rightward direction based on the current image 700, a hole region 711 may occur on a left side of the object 701. A position in which the hole region 711 occurs may correspond to the background region 703. For example, a pixel value of the hole region 711 may be similar to a pixel value of the background region 703. Thus, the image processing apparatus 100 may precisely restore the hole region 711 by determining the pixel value of the hole region 711 based on the background region 703 of the preceding image 702. The background region 703 may not reflect the position of the object 701 differently displayed on each of a first view image 712 corresponding to the time t−1 and the preceding image 702 corresponding to the time t−1, and a change in a background region based on the position of the object 701. Thus, by determining the pixel value of the hole region 711 based on a background region 713 additionally indicated in the first view image 712 corresponding to the time t−1 as compared to the first view image 710 corresponding to the time t, the image processing apparatus 100 may restore the hole region 711 more precisely when compared to using the background region 703. The first view image 712 corresponding to the time t−1 may be an image acquired by restoring a hole region 714 based on a first view image corresponding to a time t−2.

Since a second view image 720 is generated by moving the object 701 in the leftward direction based on the current image 700, a hole region 721 may occur on a right side of the object 701. A position in which the hole region 721 occurs may correspond to the background region 705. For example, a pixel value of the hole region 721 may be similar to a pixel value of the background region 705. Thus, the image processing apparatus 100 may precisely restore the hole region 721 by determining the pixel value of the hole region 721 based on the background region 705 of the subsequent image 704. The background region 705 may not reflect the position of the object 701 differently indicated in each of a second view image 722 corresponding to the time t+1 and the subsequent image 704 corresponding to the time t+1, and a change in a background region based on the position of the object 701. Thus, by determining the pixel value of the hole region 721 based on a background region 723 additionally indicated in the second view image 722 corresponding to the time t+1 as compared to the second view image 720 corresponding to the time t, the image processing apparatus 100 may restore the hole region 721 more precisely when compared to using the background region 705. The second view image 722 corresponding to the time t+1 may be an image acquired by restoring a hole region 724 based on a second view image corresponding to a time t+2.

Figure 8:
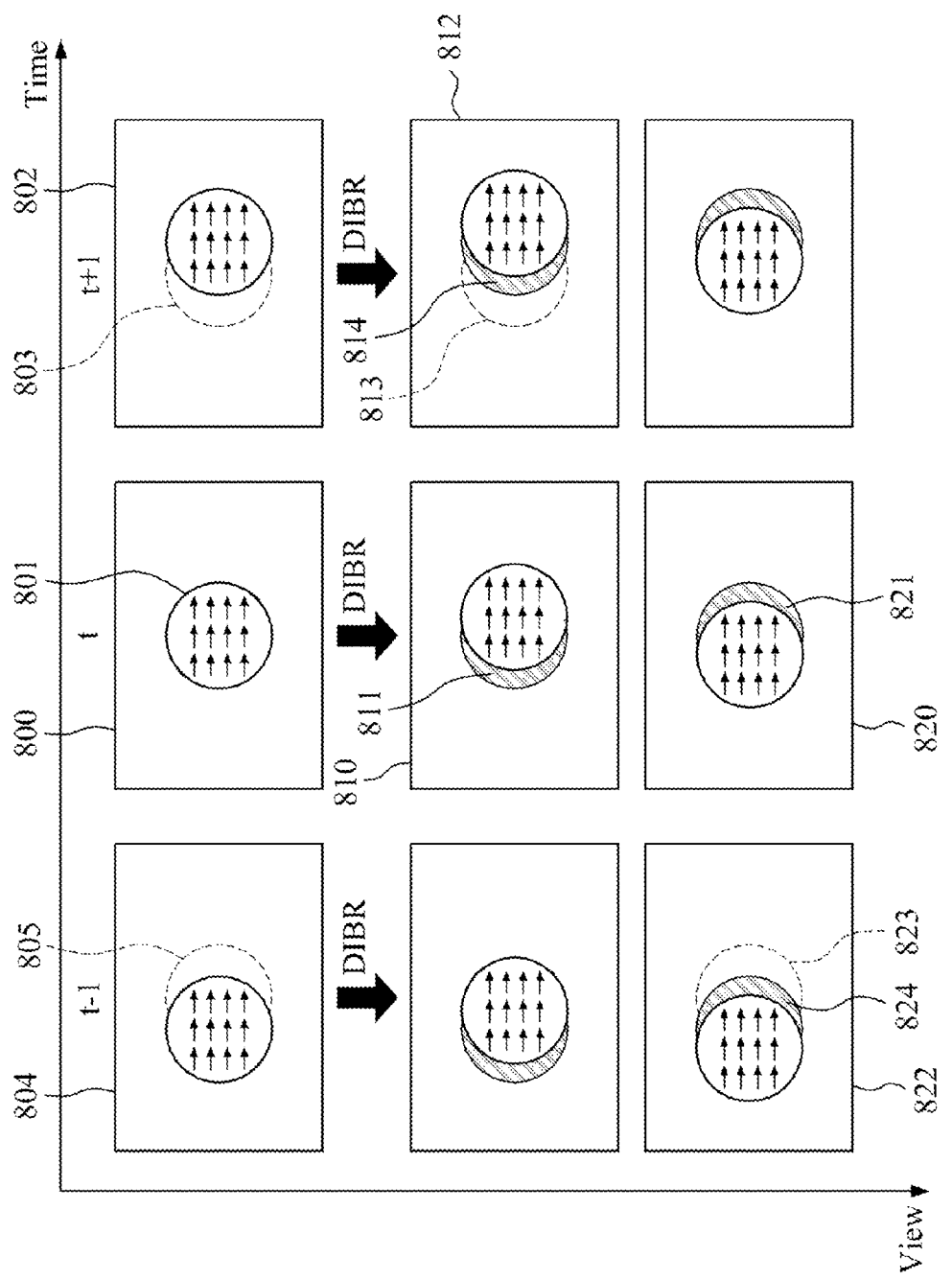
FIG. 8 illustrates an example of processing an image including an object moving in a rightward direction according to at least one example embodiment.

FIG. 8 illustrates an example of processing an image including an object moving in a rightward direction according to at least one example embodiment.

When an object 801 displayed on a color image moves in the rightward direction, a subsequent image 802 corresponding to a time t+1 may additionally indicate a background region 803 obscured by the object 801 in a current image 800 corresponding to a time t. A background region 805 of a background region of a preceding image 804 may be obscured by the object 801 in the current image 800 corresponding to the time t.

In this example, since a first view image 810 is generated by moving the object 801 in the rightward direction based on the current image 800, a hole region 811 may occur on a left side of the object 801. A position in which the hole region 811 occurs may correspond to the background region 803. For example, a pixel value of the hole region 811 may be similar to a pixel value of the background region 803. Thus, the image processing apparatus 100 may precisely restore the hole region 811 by determining the pixel value of the hole region 811 based on the background region 803 of the subsequent image 802. The background region 803 may not reflect the position of the object 801 differently displayed on each of a first view image 812 corresponding to the time t+1 and the subsequent image 802 corresponding to the time t+1, and a change in the background region based on the position of the object 801. Thus, by determining the pixel value of the hole region 811 based on a background region 813 additionally indicated in the first view image 812 corresponding to the time t+1 as compared to the first view image 810 corresponding to the time t, the image processing apparatus 100 may restore the hole region 811 more precisely when compared to using the background region 803. The first view image 812 corresponding to the time t+1 may be an image acquired by restoring a hole region 814 based on a first view image corresponding to a time t+2.

Since a second view image 820 is generated by moving the object 801 in the leftward direction based on the current image 800, a hole region 821 may occur on the right side of the object 801. A position in which the hole region 821 occurs may correspond to the background region 805. For example, a pixel value of the hole region 821 may be similar to a pixel value of the background region 805. Thus, the image processing apparatus 100 may precisely restore the hole region 821 by determining the pixel value of the hole region 821 based on the background region 805 of the preceding image 804. The background region 805 may not reflect the position of the object 801 differently displayed on each of a second view image 822 corresponding to the time t−1 and the preceding image 804 corresponding to the time t−1, and a change in a background region based on the position of the object 801. Thus, by determining the pixel value of the hole region 821 based on a background region 823 additionally indicated in the second view image 822 corresponding to the time t−1 as compared to the second view image 820 corresponding to the time t, the image processing apparatus 100 may restore the hole region 821 more precisely when compared to using the background region 805. The second view image 822 corresponding to the time t−1 may be an image acquired by restoring a hole region 824 based on a second view image corresponding to a time t−2.

Figure 9:
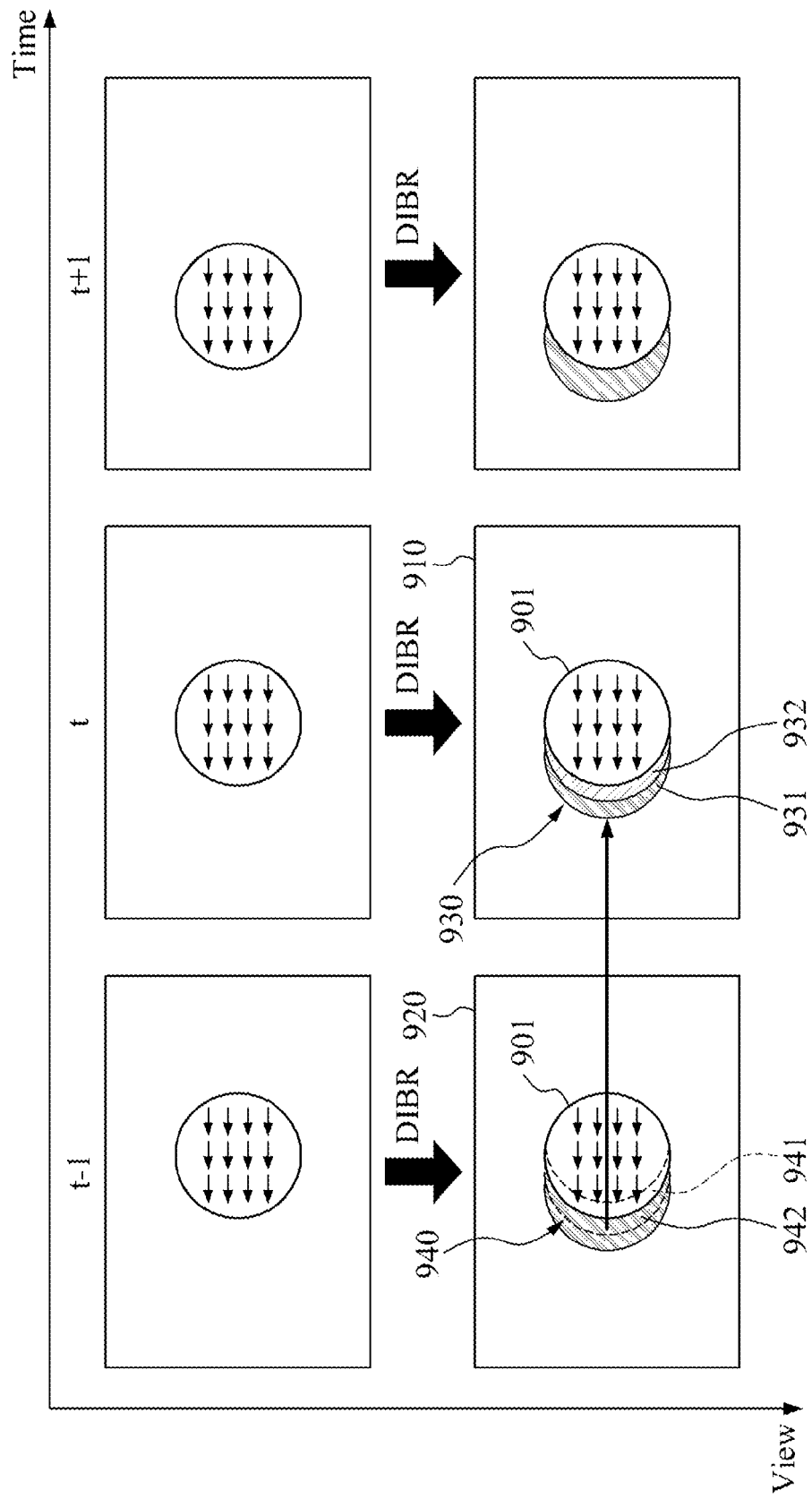
FIG. 9 illustrates another example of processing an image when all pixels of a hole region are not determined by an image processing apparatus based on a neighboring image according to at least one example embodiment.

FIG. 9 illustrates another example of processing an image when all pixels of a hole region are not determined by an image processing apparatus based on a neighboring image according to at least one example embodiment.

A hole region may include a region in which it is not possible for the image processing apparatus 100 to determine a pixel value based on a neighboring image. For example, when a distance by which an object 901 horizontally moves is less than a threshold, a difference between a size of the object 901 displayed on a first view image 910 corresponding to a current time, for example, a time t, and a size of the object 901 displayed on a first view image 920 corresponding to a time t−1 may be relatively small. In this example, a region 941 which is a portion of a background region 940 corresponding to a hole region 930 and not indicated in the first view image 910 corresponding to the current time may be obscured by the object 901 at the time t−1. For example, a pixel value of the region 941 may be absent in the first view image 920 corresponding to the time t−1. Thus, a pixel value of a region 931 corresponding to the region 941 of the hole region 910 may not be determined based on the first view image 920 corresponding to the time t−1.

The image processing apparatus 100 may classify the hole region 930 into the region 931 corresponding to the region 941 and a region 932 corresponding to a region 942 in which a background is indicated in the first view image 920, and process each of the region 931 and the region 932 using a different method. For example, the image processing apparatus 100 may determine a pixel value of the region 932 based on a pixel value included in the region 942. Also, the image processing apparatus 100 may determine a pixel value of the region 931 based on pixel values of neighboring regions located on a left side and a right side of the hole region 930. The image processing apparatus 100 may determine the pixel value of the region 931 based on the pixel value of the region 932 and a pixel value of a neighboring region located on the right side of the hole region 930, thereby minimizing an error caused by a difference among the pixel values of the neighboring regions.

Figure 10:
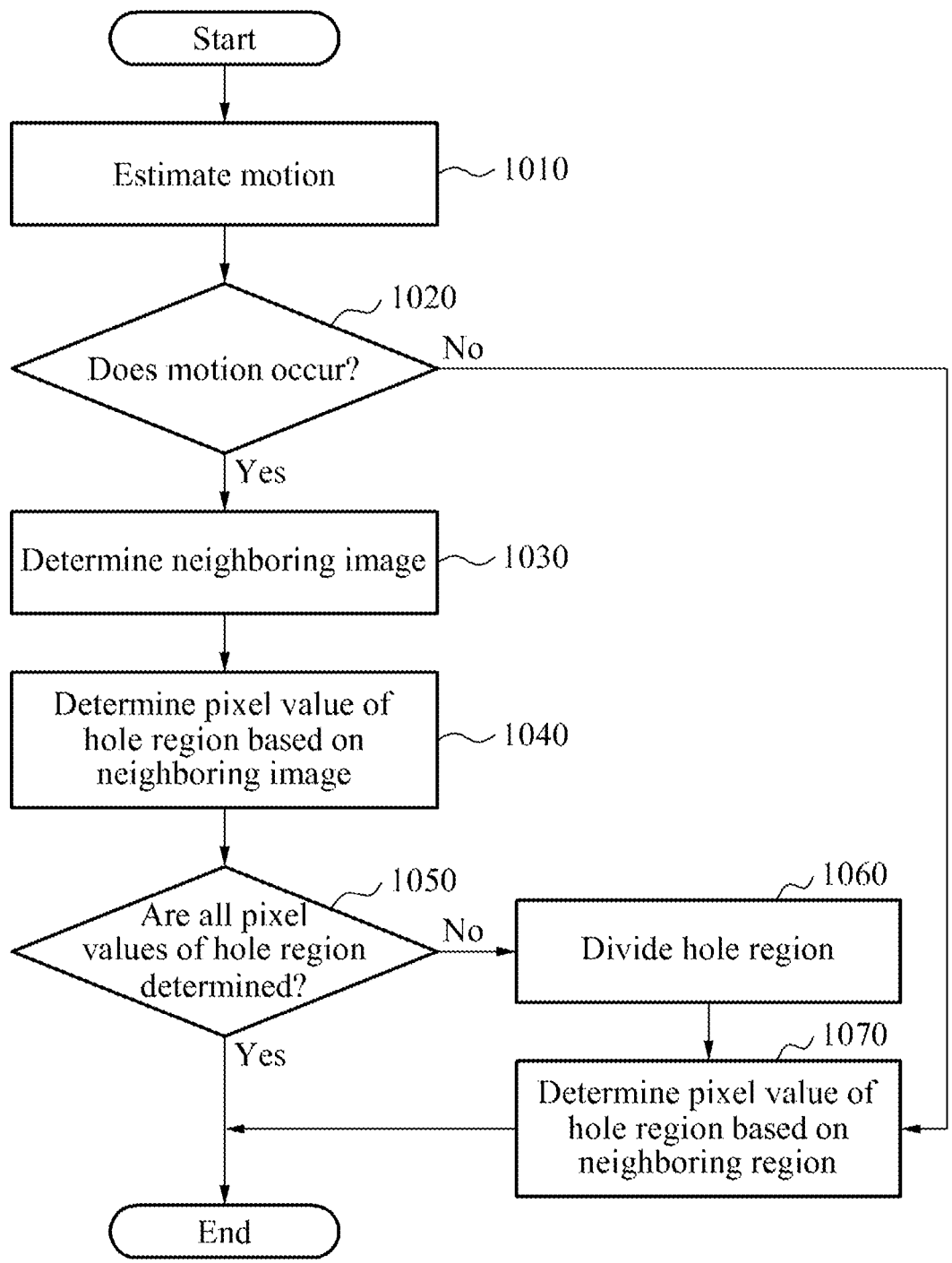
FIG. 10 illustrates an example of an image processing method according to at least one example embodiment.

FIG. 10 illustrates an example of an image processing method according to at least one example embodiment.

In operation 1010, the motion estimator 110 may estimate a motion of an object included in a current image. The motion estimator 110 may determine whether the object moves, by comparing a horizontal component of a motion vector of a neighboring region to a threshold. The motion estimator 110 may estimate a type of the motion of the object, to be one of a translation and a zoom based on depth information and the motion vector of the neighboring region. The motion estimator 110 may identify a foreground region from a left neighboring region and a right neighboring region based on depth information on the left neighboring region and depth information on the right neighboring region. The motion estimator 110 may extract a region corresponding to the foreground region from a preceding region based on a motion vector of the foreground region and compare depth information on the extracted region and depth information on the foreground region, thereby estimating whether the zoom occurs. For example, when a difference in depth information between the foreground region and the extracted region is greater than a positive threshold, the motion estimator 110 may estimate the type of the motion of the object to be a zoom-in. When the difference in depth information between the foreground region and the extracted region is less than a negative threshold, the motion estimator 110 may estimate the type of the motion of the object to be a zoom-out. When the difference in depth information between the foreground region and the extracted region is less than the positive threshold and greater than the negative threshold, the motion estimator 110 may estimate the type of the motion of the object to be the translation.

In operation 1020, the motion estimator 1020 may verify whether the motion of the object occurs, based on a result of the estimating performed in operation 1010. When the motion of the object occurs, the motion estimator 1010 may operate the image determiner 120 to perform operation 1030. When the motion of the object does not occur, the motion estimator 1010 may operate the pixel value determiner 140 and perform operation 1070.

In operation 1030, the image determiner 120 may determine a neighboring image temporally neighboring the current image based on the motion estimated in operation 1010.

In operation 1040, the pixel value determiner 140 may determine a pixel value of the hole region neighboring the object based on the neighboring image determined in operation 1030. In this example, the pixel value determiner 140 may search for a pixel corresponding to the hole region from the neighboring image based on the motion vector of the hole region, and determine the pixel value of the hole region based on a pixel value of the found pixel.

In operation 1050, the hole region divider 130 may verify whether all pixel values of the hole region are determined in operation 1040. The hole region divider 130 may identify a pixel for which a pixel value is not determined based on the neighboring image determined by the image determiner 120. When the pixel for which the pixel value is not determined based on the neighboring image is identified to be present, the hole region divider 130 may determine that all pixel values of the hole region are not determined in operation 1040, and perform operation 1060.

In operation 1060, the hole region divider 130 may divide the hole region into a first region of which a pixel value is determined in operation 1060, and a region of which pixel value is not determined in operation 1060.

In operation 1070, the pixel value determiner 140 may determine the pixel value of the hole region based on the pixel value of the neighboring region of the hole region. For example, when the hole region is divided in operation 1060, the pixel value determiner 140 may determine the pixel value of the second region of the hole region based on the pixel value of the neighboring region. The pixel value determiner 140 may also determine the pixel value based on the pixel value of the first region and a pixel value of a neighboring region located in an opposite direction to the first region. For example, when the hole region occurs on a right side of the object, the first region may be located on the right side of the hole region. In this example, the pixel value determiner 140 may determine the pixel value of the second region based on the pixel value of the first region and a pixel value of a neighboring region located on a left side of the hole region.

When the motion does not occur in operation 1020, the pixel value determiner 140 may determine the pixel value of the hole region based on the pixel values of the neighboring regions located on the left side and the right side of the hole region.

Figure 11:
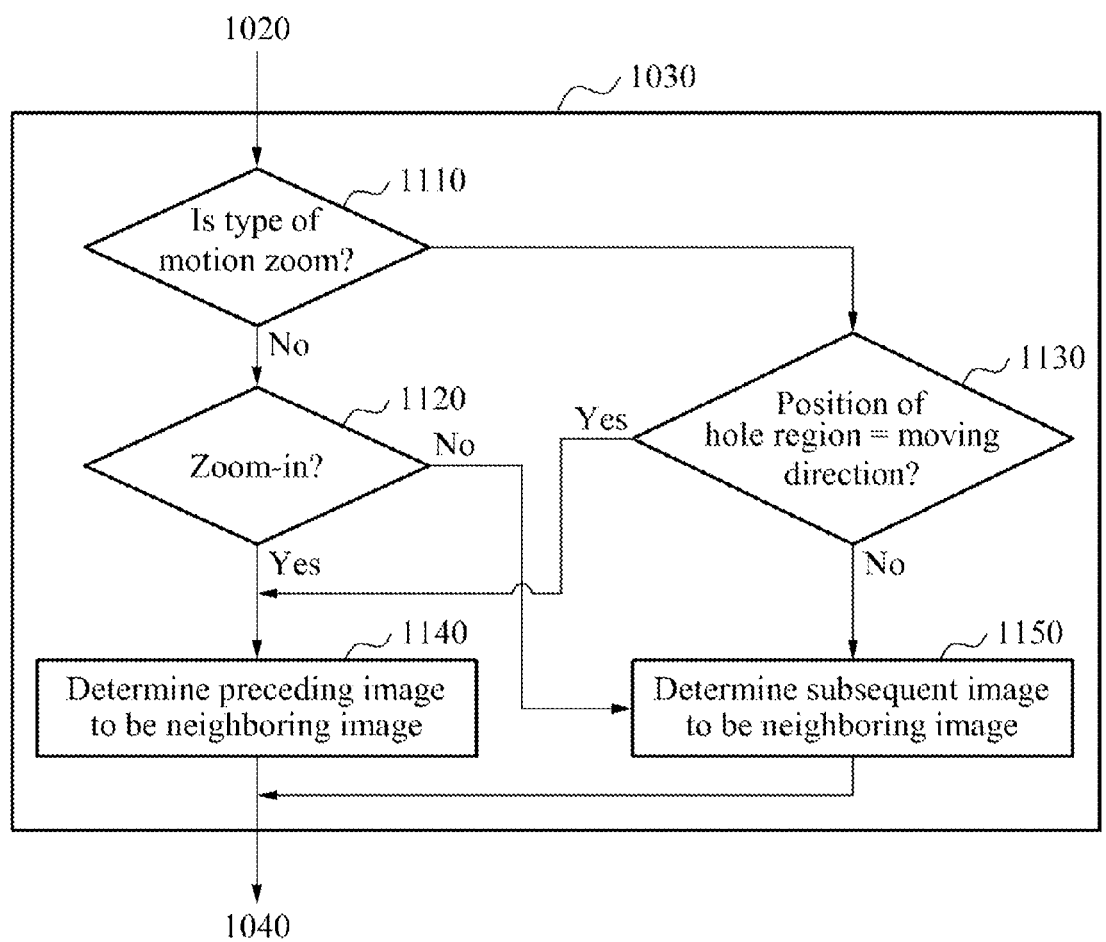
FIG. 11 illustrates a method of determining a neighboring image according to at least one example embodiment.

FIG. 11 illustrates a method of determining a neighboring image according to at least one example embodiment.

Operations 1110 through 1150 of FIG. 11 may be included in operation 1030 of FIG. 10.

In operation 1110, the image determiner 120 may determine whether the motion estimated in operation 1010 of FIG. 10 is a zoom. When the estimated motion is the zoom, the image determiner 120 may perform operation 1120 to determine a type of the zoom. When the estimated motion is not the zoom, the image determiner 120 may perform operation 1130 to determine a position of a hole region and a moving direction.

In operation 1120, when the estimated motion is the zoom, the image determiner 120 may determine whether the type of the motion is a zoom-in. When the type of the motion is the zoom-in, the image determiner 120 may perform operation 1140 to determine a preceding image of a current image to be a neighboring image. When the type of the motion is not the zoom-in, the image determiner 120 may perform operation 1150 to determine a subsequent image of the current image to be the neighboring image.

In operation 1130, the image determiner 120 may determine whether the position of the hole region is identical to the moving direction. For example, when a direction in which the hole region is located is identical to the moving direction of the object, the image determiner 120 may determine that the position of the hole region is identical to the moving direction, and perform operation 1140 to determine the preceding image of the current image to be the neighboring image. When the direction in which the hole region is located is opposite to the moving direction of the object, the image determiner 120 may determine that the position of the hole region differs from the moving direction, and perform operation 1150 to determine the subsequent image of the current image to be the neighboring image.

Figure 12:
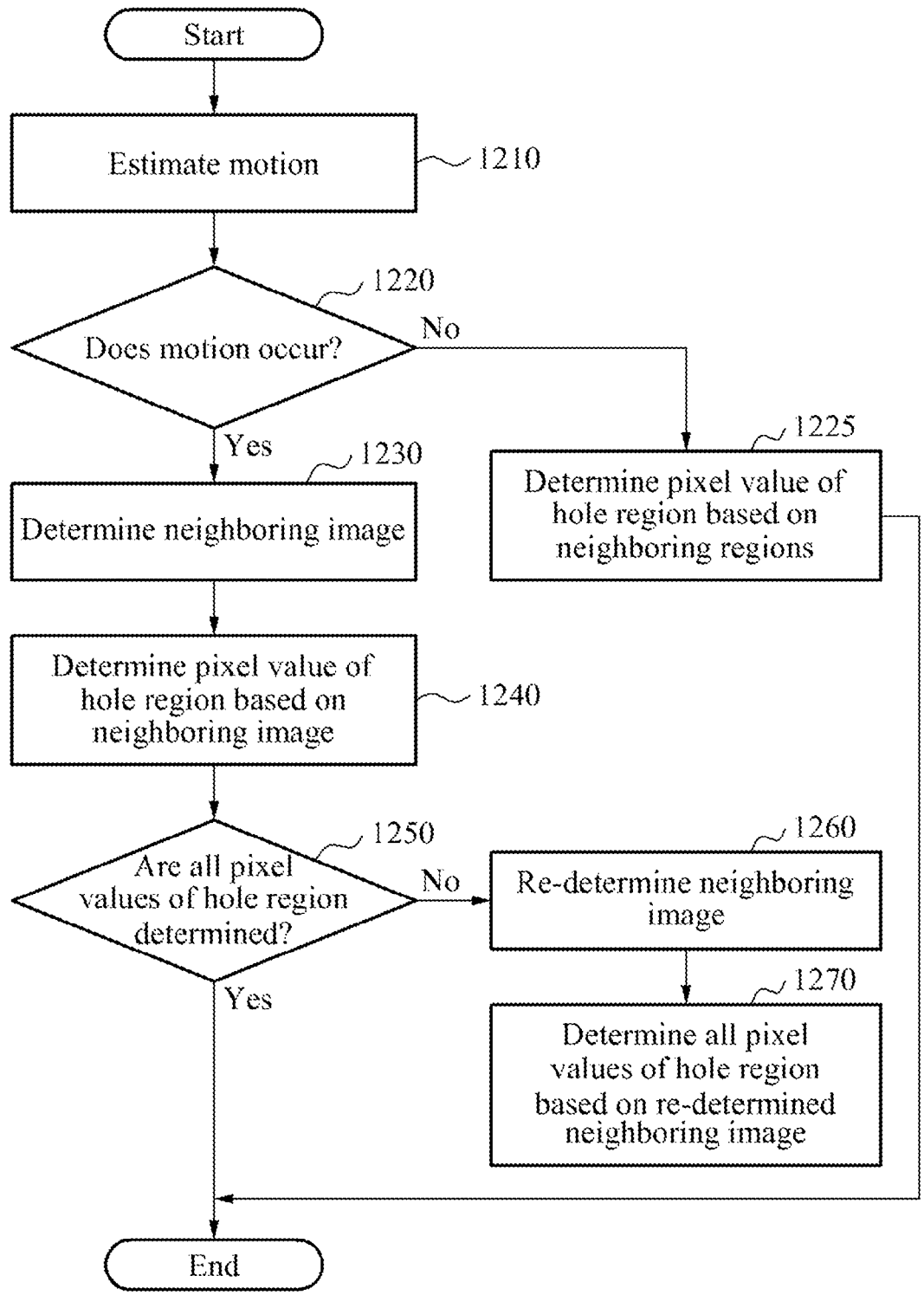
FIG. 12 illustrates another example of an image processing method according to at least one example embodiment.

FIG. 12 illustrates another example of an image processing method according to at least one example embodiment.

In operation 1210, the motion estimator 110 may estimate a motion of an object included in a current image. The motion estimator 110 may determine whether the object moves, by comparing a horizontal component of a motion vector of a neighboring region to a threshold, and estimate a type of the motion of the object to be one of a translation and a zoom based on depth information and the motion vector of the neighboring region.

In operation 1220, the motion estimator 110 may verify whether the motion of the object occurs, based on a result of the estimating performed in operation 1210. When the motion of the object occurs, the motion estimator 110 may operate the image determiner 120 and perform operation 1230. When the motion of the object does not occur, the motion estimator 110 may operate the pixel value determiner 140 and perform operation 1225.

In operation 1225, the pixel value determiner 140 may determine a pixel value of a hole region based on pixel values of neighboring regions located on a left side and a right side of the hole region.

In operation 1230, the image determiner 120 may determine a neighboring image temporally neighboring the current image based on the motion estimated in operation 1210.

In operation 1240, the pixel value determiner 140 may determine the pixel value of the hole region neighboring the object based on the neighboring image determined in operation 1230. In this example, the pixel value determiner 140 may search for a pixel corresponding to the hole region from the neighboring image based on a motion vector of the hole region, and determine the pixel value of the hole region based on a pixel value of the found pixel.

In operation 1250, the hole region divider 130 may verify whether all pixel values of the hole region are determined in operation 1240. In this example, the hole region divider 130 may identify a pixel for which a pixel value is not determine based on the neighboring image determined by the image determiner 120. When the pixel for which the pixel value is not determined based on the neighboring image is identified to be present, the hole region divider 130 may determine that all pixel values of the hole region are not determined in operation 1240, and perform operation 1260.

In operation 1260, the image determiner 120 may search for an image in which all pixel values of the hole region are determined, from the preceding image and the subsequent image of the current image, and re-determine the found image to be the neighboring image.

In operation 1270, the pixel value determiner 140 may determine all pixel values of the hole region based on a pixel value of the neighboring image re-determined in operation 1260.

Figure 13:
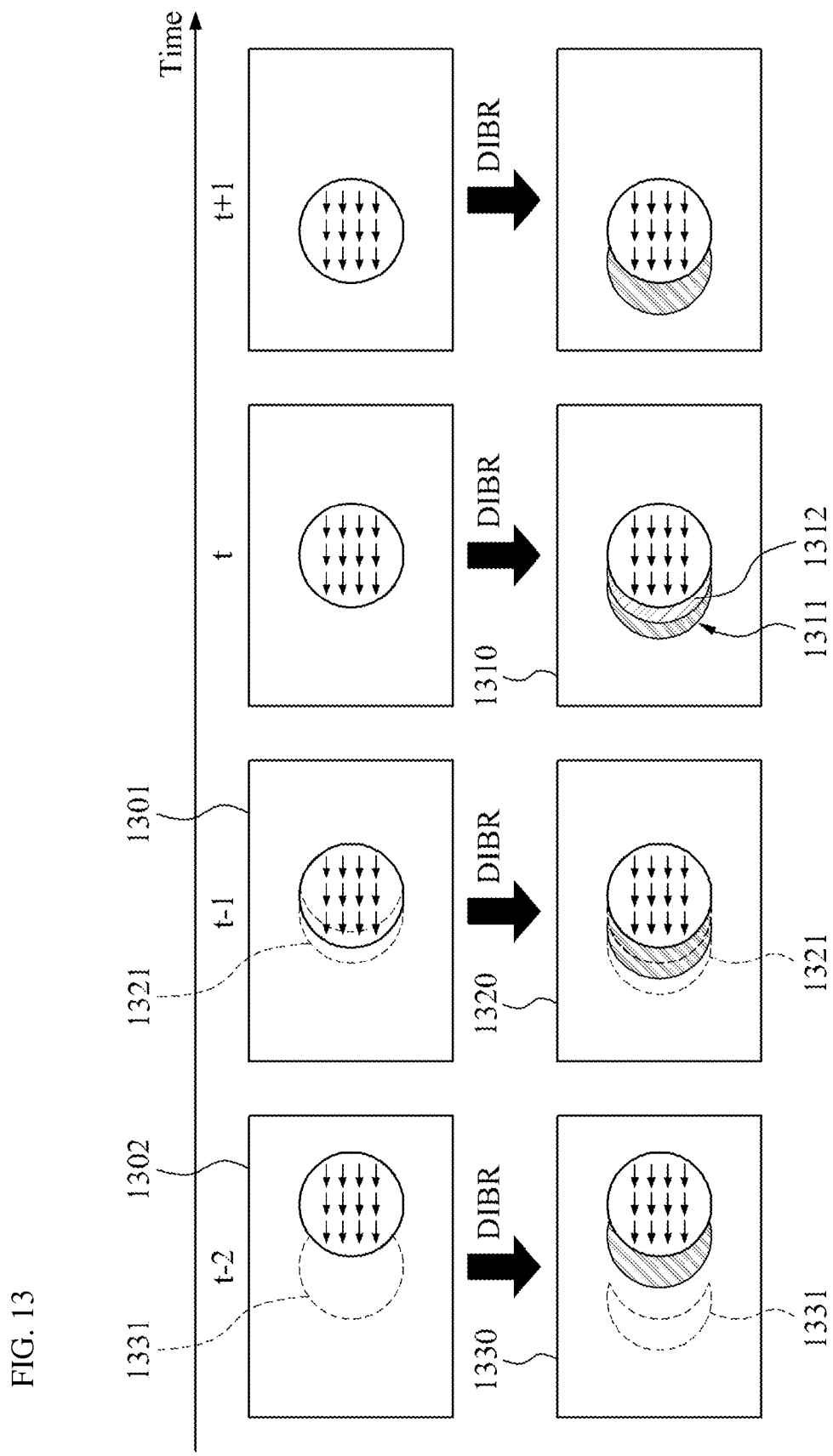
FIG. 13 illustrates an example of processing a hole region located on a left side of an object in the image processing method of FIG. 12.

FIG. 13 illustrates an example of processing a hole region located on a left side of an object in the image processing method of FIG. 12.

A hole region 1311 of a first view image 1310 corresponding to a time t may include a region 1312 in which it is not possible for the image processing apparatus 100 to determine a pixel value based on a neighboring image. The neighboring image may be a preceding image 1301 corresponding to a time t−1 or a first time view 1320 corresponding to the time t−1. As shown in FIG. 13, a portion of a background region 1321 corresponding to the hole region 1311 may be obscured by an object and thus, the preceding image 1301 corresponding to the time t−1 or the first view image 1320 corresponding to the time t−1 may not include a pixel value corresponding to the region 1312.

The image determiner 120 may search for an image including the pixel value corresponding to the region 1312 from images preceding the neighboring image. For example, the image determiner 120 may search for a preceding image 1302 corresponding to a time t−2 or a first view image 1330 corresponding to the time t−2. In the preceding image 1302 corresponding to the time t−2 or the first view image 1330 corresponding to the time t−2, a background region 1331 corresponding to the hole region 1311 may not be obscured by the object. Thus, all pixel values of the hole region 1311 may be determined based on a pixel value included in the background region 1331. Accordingly, the image determiner 120 may determine the preceding image 1302 corresponding to the time t−2 or the first view image 1330 corresponding to the time t−2, to be the neighboring image. A position of the object in the first view image 1330 corresponding to the time t−2 may be similar than a position of the object in the first view image 1310 corresponding to the time t when compared to the preceding image 1302 corresponding to the time t−2. The image determiner 120 may more precisely restore the hole region 1311 by determining the first view image 1330 corresponding to the time t−2 to be the neighboring image, as compared to determining the preceding image 1301 corresponding to the time t−1 to be the neighboring image.

Figure 14:
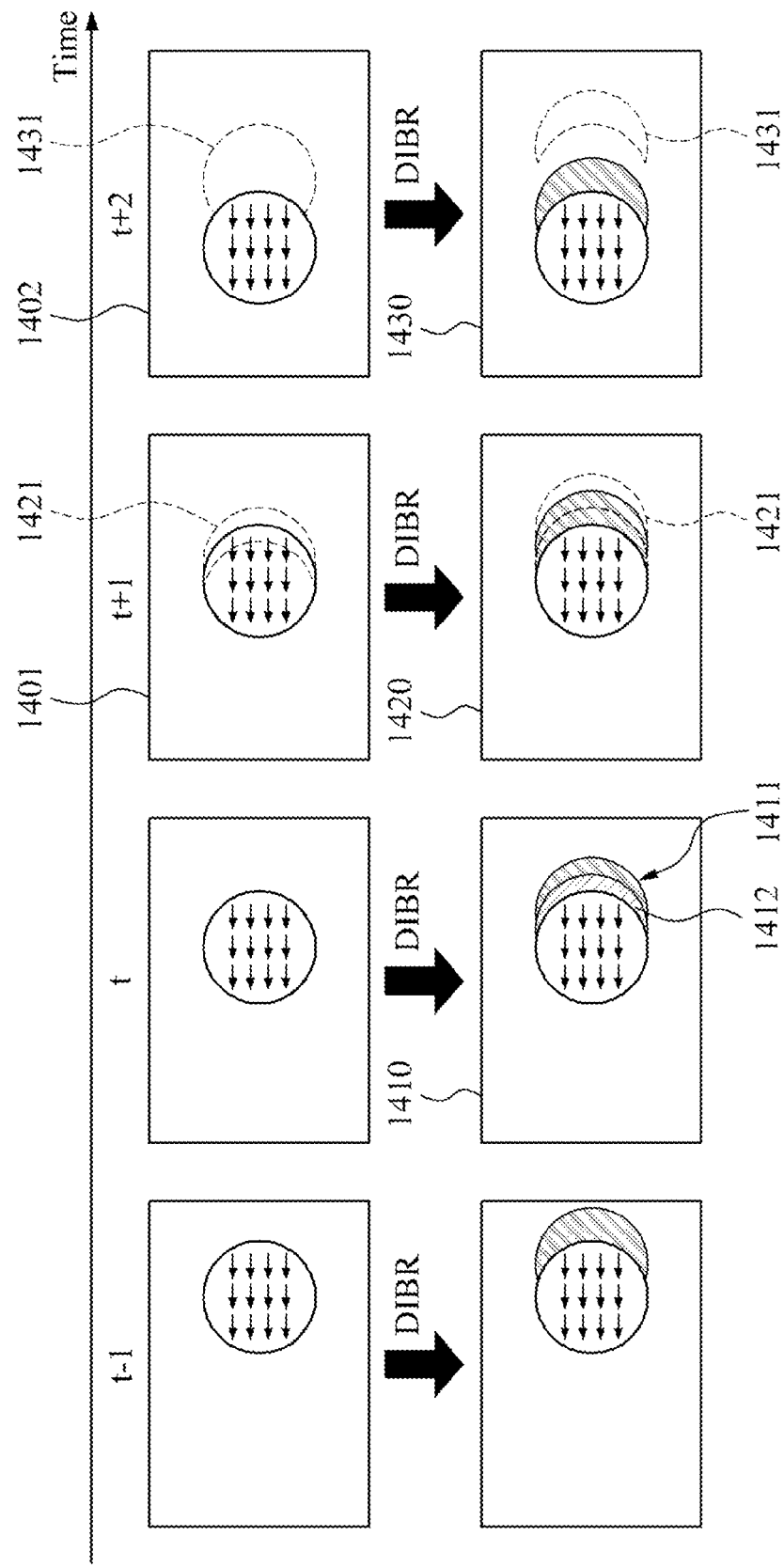
FIG. 14 illustrates an example of processing a hole region located on a right side of an object in the image processing method of FIG. 12.

FIG. 14 illustrates an example of processing a hole region located on a right side of an object in the image processing method of FIG. 12.

A hole region 1411 of a first view image 1410 corresponding to a time t may include a region 1412 in which it is not possible for the image processing apparatus 100 to determine a pixel value based on a neighboring image. The neighboring image may be a subsequent image 1401 corresponding to a time t+1 or a first time view 1420 corresponding to the time t+1. As shown in FIG. 14, a portion of a background region 1421 corresponding to the hole region 1411 may be obscured by an object and thus, the subsequent image 1401 corresponding to the time t+1 or the first view image 1420 corresponding to the time t+1 may not include a pixel value corresponding to the region 1412.

The image determiner 120 may search for an image including the pixel value corresponding to the region 1412 from images subsequent to the neighboring image. For example, the image determiner 120 may search for a subsequent image 1402 corresponding to a time t+2 or a first view image 1430 corresponding to the time t+2. In the subsequent image 1402 corresponding to the time t+2 or the first view image 1430 corresponding to the time t+2, a background region 1431 corresponding to the hole region 1411 may not be obscured by the object. Thus, all pixel values of the hole region 1411 may be determined based on a pixel value included in the background region 1431. Accordingly, the image determiner 120 may determine the subsequent image 1402 corresponding to the time t+2 or the first view image 1430 corresponding to the time t+2, to be the neighboring image. A position of the object in the first view image 1430 corresponding to the time t+2 may be similar than a position of the object in the first view image 1410 corresponding to the time t when compared to the subsequent image 1402 corresponding to the time t+2. The image determiner 120 may more precisely restore the hole region 1411 by determining the first view image 1430 corresponding to the time t+2 to be the neighboring image, as compared to determining the subsequent image 1402 corresponding to the time t+2 to be the neighboring image.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. An image processing apparatus comprising:
a processor configured to execute computer-readable instructions to,
estimate a motion of an object included in a current image;
determine a neighboring image neighboring the current image based on the motion of the object; and
determine a pixel value of a hole region neighboring the object based on the neighboring image,
wherein if the hole region includes a pixel for which a pixel value is not determined based on the neighboring image, the processor searches images preceding or subsequent to the current image for an image in which all pixel values of the hole region are determined, and the processor is configured to execute the computer-readable instructions to determine the image in which all pixel values of the hole region are determined to be the neighboring image.

2. The apparatus of claim 1, wherein the processor is configured to execute the computer-readable instructions to determine one of the images preceding the current image to be the neighboring image if the estimated motion of the object corresponds to a zoom-in motion.

3. The apparatus of claim 1, wherein the processor is configured to execute the computer-readable instructions to determine one of the images subsequent to the current image to be the neighboring image if the estimated motion of the object corresponds to a zoom-out motion.

4. The apparatus of claim 1, wherein the processor is configured to execute the computer-readable instructions to determine one of the images preceding and subsequent to the current image to be the neighboring image based on a position of the hole region and a moving direction of the object.

5. The apparatus of claim 4, wherein the processor is configured to execute the computer-readable instructions to determine one of the images preceding the current image to be the neighboring image when the moving direction of the object is identical to a direction in which the hole region is located.

6. The apparatus of claim 4, wherein the processor is configured to execute the computer-readable instructions to determine one of the images subsequent to the current image to be the neighboring image if the moving direction of the object is opposite to a direction in which the hole region is located.

7. The apparatus of claim 1, wherein the processor is configured to execute the computer-readable instructions to divide the hole region into a first region and a second region.

8. The apparatus of claim 7, wherein the processor is configured to execute the computer-readable instructions to divide the hole region into the first region and the second region based on a size of the hole region and a motion vector of a neighboring region of the hole region.

9. The apparatus of claim 7, wherein the processor is configured to execute the computer-readable instructions to determine a pixel value of the second region based on a pixel value of the first region and a pixel value of a neighboring region of the hole region.

10. The apparatus of claim 1, wherein the processor is configured to execute the computer-readable instructions to search a neighboring region for a pixel corresponding to the hole region based on a motion vector of the hole region and determine the pixel value of the hole region based on a pixel value of the pixel corresponding to the hole region.

11. The apparatus of claim 10, wherein the processor is configured to execute the computer-readable instructions to predict the motion vector of the hole region, and set a search range for a pixel in the neighboring region based on an accuracy of the predicted motion vector.

12. The apparatus of claim 1, wherein the current image corresponds to at least one depth image based rendering (DIBR) multiview image, and the processor is configured to execute the computer-readable instructions to use a DIBR multiview image of one of the preceding images as the first neighboring image for the first view image and a DIBR-applied multiview image of one of the subsequent images as a second neighboring image for a second view image of the current image.

13. The apparatus of claim 1, wherein the current image corresponds to at least one depth image based rendering (DIBR)-multiview image, the processor is configured to execute the computer-readable instructions to apply DIBR to the neighboring image to generate a multiview image of the neighboring image and determine the pixel value of the hole region.

14. An image processing method comprising:
    estimating a motion of an object included in a current image;
    determining a neighboring image neighboring the current image based on the estimated motion of the object;
    determining a pixel value of a hole region neighboring the object based on the neighboring image;
    searching images preceding or subsequent to the current image for an image in which all pixel values of the hole region are determined, when the hole region includes a pixel for which a pixel values is not determined based on the neighboring image; and
    determining the image in which all pixel values of the hole region are determined to be the neighboring image.

15. The method of claim 14, wherein the determining the neighboring image comprises determining one of the images preceding the current image to be the neighboring image if the estimated motion of the object corresponds to a zoom-in motion.

16. The method of claim 14, wherein the determining the neighboring image comprises determining one of the images subsequent to the current image to be the neighboring image if the estimated motion of the object corresponds to a zoom-out motion.

17. The method of claim 14, wherein the determining the neighboring image comprises determining one of the images preceding and subsequent to the current image to be the first neighboring image based on a position of the hole region and a moving direction of the object.

18. The method of claim 14, wherein the determining the pixel value comprises:
    searching the neighboring image for a pixel corresponding to the hole region based on a motion vector of the hole region; and
    determining the pixel value of the hole region based on the searching.

19. A non-transitory computer-readable medium comprising a program for instructing a computer to perform the method of claim 14.

* * * * *